United States Patent
Zo et al.

(10) Patent No.: US 9,239,646 B2
(45) Date of Patent: Jan. 19, 2016

(54) ELECTRONIC DEVICE AND ELECTRONIC NOTE SYSTEM USING THE SAME

(71) Applicant: LG ELECTRONICS INC., Seoul (KR)

(72) Inventors: Sungh Zo, Seoul (KR); Taeyoung Jeong, Incheon (KR); Sungchae Na, Anyang (KR)

(73) Assignee: LG Electronics Inc., Seoul (KR)

( * ) Notice: Subject to any disclaimer, the term of this patent is extended or adjusted under 35 U.S.C. 154(b) by 175 days.

(21) Appl. No.: 13/861,704

(22) Filed: Apr. 12, 2013

(65) Prior Publication Data

US 2014/0035843 A1 Feb. 6, 2014

(30) Foreign Application Priority Data

Aug. 2, 2012 (KR) ........................ 10-2012-0084994

(51) Int. Cl.
| | |
|---|---|
| *G06F 3/041* | (2006.01) |
| *G06F 3/033* | (2013.01) |
| *G06F 9/44* | (2006.01) |
| *H04M 1/725* | (2006.01) |
| *G06F 3/0488* | (2013.01) |
| *G06F 3/0354* | (2013.01) |
| *G06F 1/16* | (2006.01) |

(52) U.S. Cl.
CPC .......... *G06F 3/0416* (2013.01); *G06F 3/03542* (2013.01); *G06F 3/04883* (2013.01); *H04M 1/7253* (2013.01); *G06F 1/1683* (2013.01); *G06F 1/1698* (2013.01); *G06F 3/03545* (2013.01); *G06F 3/0412* (2013.01); *G06F 2203/0381* (2013.01)

(58) Field of Classification Search
CPC ............ G06F 3/03545; G06F 3/03542; G06F 3/0412; G06F 3/0416; G06F 1/1698; G06F 3/04883; G06F 1/1683; G06F 2203/0381; H04M 1/7253
See application file for complete search history.

(56) References Cited

U.S. PATENT DOCUMENTS

| | | | | |
|---|---|---|---|---|
| 5,581,783 | A | 12/1996 | Ohashi | |
| 5,953,001 | A * | 9/1999 | Challener et al. | 345/179 |
| 7,646,379 | B1 * | 1/2010 | Drennan et al. | 345/177 |
| 2003/0117408 | A1 * | 6/2003 | Forsline et al. | 345/581 |

(Continued)

FOREIGN PATENT DOCUMENTS

EP 0 298 482 1/1989

OTHER PUBLICATIONS

Extended European Search Report for Application 13163247.3 dated Dec. 3, 2013.

(Continued)

*Primary Examiner* — Michael J Eurice
(74) *Attorney, Agent, or Firm* — KED & Associates LLP

(57) ABSTRACT

The present disclosure relates to an electronic device which is sensitive to touch, and an electronic note system using the same. An electronic device according to one exemplary embodiment includes a wireless communication unit to receive color information from an external touch tool via a wireless communication, a display unit to output an image object displayed with a color corresponding to the received color information, and a controller to activate an electronic note function in response to a touch input applied onto the image object, wherein the controller controls the display unit to display information with a color corresponding to the color information, the information being input by a touch input applied onto the display unit.

17 Claims, 23 Drawing Sheets

(56) References Cited

U.S. PATENT DOCUMENTS

| | | | |
|---|---|---|---|
| 2003/0146907 A1* | 8/2003 | Boals et al. | 345/179 |
| 2005/0024346 A1* | 2/2005 | Dupraz et al. | 345/179 |
| 2005/0231488 A1* | 10/2005 | Chou | 345/179 |
| 2007/0123227 A1 | 5/2007 | Hong et al. | |
| 2007/0139399 A1* | 6/2007 | Cook | 345/179 |
| 2009/0244005 A1* | 10/2009 | Fukushima | 345/158 |
| 2011/0164000 A1* | 7/2011 | Pance | 345/179 |
| 2011/0199343 A1* | 8/2011 | Cinqualbre | 345/179 |

OTHER PUBLICATIONS

Anonymous: "Concept of digital pen Chromopen for Wacom" posted Oct. 30, 2011 URL: http://cutedecision.com/concept-of-digital-pen-chromopen-for-wacom/ pp. 1-4.

Johan: "Chromopen Wacom Pen" Oct. 15, 2011 URL: http://www.techfresh.net/chromogen-wacom-pen/ pp. 1-6.

* cited by examiner

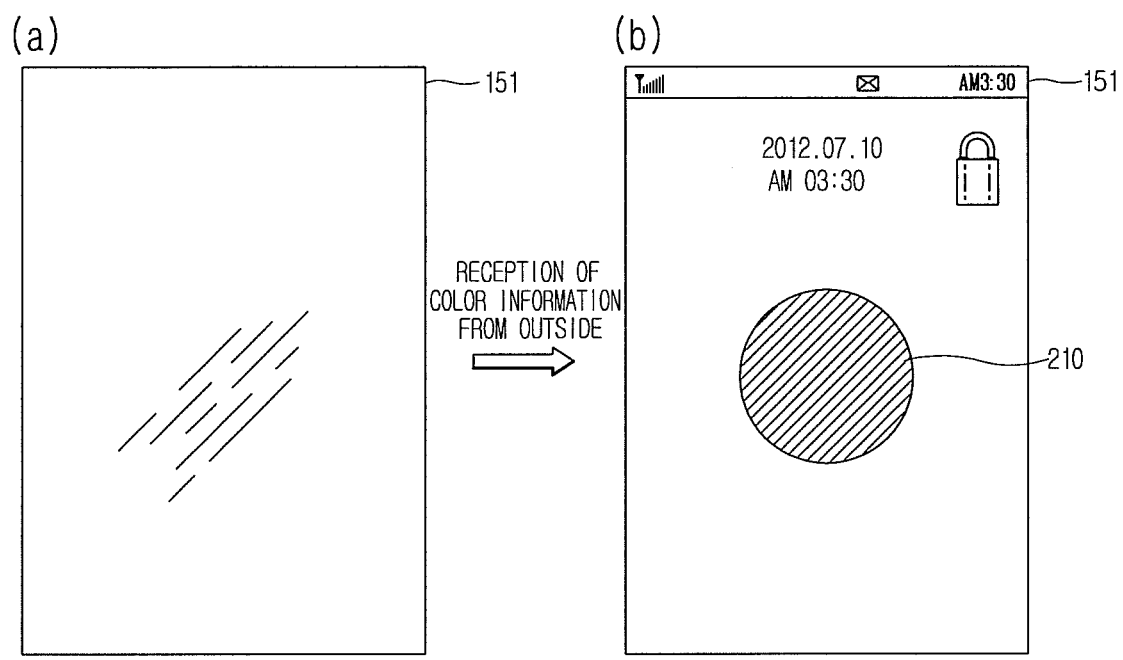

(a)  (b)

ELECTRONIC DEVICE AND ELECTRONIC NOTE SYSTEM USING THE SAME

CROSS-REFERENCE TO RELATED APPLICATION

Pursuant to 35 U.S.C. §119(a), this application claims the benefit of earlier filing date and right of priority to Korean Application No. 10-2012-0084994, filed on Aug. 2, 2012, the contents of which is incorporated by reference herein in its entirety.

BACKGROUND OF THE INVENTION

1. Field of the Invention

This specification relates to an electronic device which is touch-sensitive, and an electronic note system using the same.

2. Background of the Invention

With rapid development of the information age, an information input/output function and a data storage function become more important in electronic devices. The electronic devices having such functions may be divided into a portable electronic device such as an electronic device and the like, and a stationary electronic device such as an image display device and the like.

As it becomes multifunctional, the electronic device can be allowed to capture still images or moving images, play music or video files, play games, receive broadcast and the like, so as to be implemented as a multimedia player. Also, such complicated functions may be applied to the stationary electronic devices for user's convenience.

In recent time, various new attempts have been made for the multimedia devices by hardware or software in order to implement such complicated functions. As one example, a user interface environment is provided in order for users to easily and conveniently perform a voice (audio) recording or retrieve or select a voice (audio) file.

Owing to such development, the electronic device may have an electronic note function. This electronic note function may allow a user to input and store (save) information (for example, text, or an image which is drawn using touch inputs) in the electronic device.

SUMMARY OF THE INVENTION

Therefore, an aspect of the detailed description is to provide an electronic device capable of utilizing an electronic note function user-desired colors in addition to previously stored colors, and a control method thereof.

Another aspect of the detailed description is to provide an electronic device capable of rapidly entering an electronic note function, and a control method thereof.

To achieve these and other advantages and in accordance with the purpose of this specification, as embodied and broadly described herein, there is provided an electronic device including a wireless communication unit to receive color information from an external touch tool via a wireless communication, a display unit to output an image object with a color corresponding to the received color information, and a controller to activate an electronic note function in response to a touch input applied onto the image object, wherein the controller may control the display unit to display information (for example, text or an image which is drawn using touch inputs) with a color corresponding to the color information. Here, the information may be input by a touch input applied onto the display unit.

In one aspect of the present disclosure, the controller may control the display unit to display the image object on a lock screen output in a lock state, in which an input of a control command with respect to an application is restricted, when the color information is received in the lock state.

In one aspect of the present disclosure, the controller may convert the lock state into an unlock state when a preset type of touch input is applied onto the image object.

In one aspect of the present disclosure, an execution screen corresponding to the electronic note function may be output on the display unit when the lock state is converted into the unlock state.

In one aspect of the present disclosure, the controller may output the lock screen after activating a light of the display unit when the light of the display unit is in a deactivated state upon reception of the color information.

In one aspect of the present disclosure, the controller may change attribute information relating to a color corresponding to the color information based on a touch input applied onto the image object. Here, the attribute information may be associated with at least one of brightness, saturation, and a displayed thickness of information input by the touch input.

In one aspect of the present disclosure, the image object may be output with a color corresponding to a different attribute information value such that the attribute information related to a color corresponding to the color information is set in response to a touch input.

In one aspect of the present disclosure, the controller may change the attribute information according to a moving path of a touch input starting on the image object, and output a guide image associated with the attribute information on the display unit such that a user can identify the changed attribute information.

In one aspect of the present disclosure, the controller may select attribute information corresponding to a point where the touch input is released.

In one aspect of the present disclosure, the controller may output a plurality of image objects having colors corresponding to a plurality of color information, respectively, on the display unit when the plurality of color information are received from the external touch tool.

In one aspect of the present disclosure, at least one color information to be used in the electronic note function may be selected from the plurality of color information based on a wireless signal received from the external touch tool, and an image object corresponding to the selected color information of the plurality of image objects may be displayed to be distinguishable from the other image objects.

In one aspect of the present disclosure, the controller may display information (for example, text or an image which is drawn using touch inputs) input by the touch input using a color corresponding to the last received color information from the external touch tool of the plurality of color information.

In one aspect of the present disclosure, the controller may change a color of information, which is output in response to a touch input applied onto the display unit, into a color corresponding to one of the plurality of color information, in an active state of the electronic note function, based on the wireless signal received from the external touch tool.

In one aspect of the present disclosure, the controller may overlap the image object on screen information, which has been output on the display unit prior to reception of the color information, and activate the electronic note function when the image object is touched by the external touch tool.

In one aspect of the present disclosure, the controller may display information, which is input by a touch input applied onto the display unit after activation of the electronic note function, in an overlapping manner on the screen information.

In one aspect of the present disclosure, the electronic device may further include an electronic device body, and a proximity sensor formed on one region of the body, and the controller may check a state of the electronic device body using the proximity sensor when the color information is received from the external touch tool. Here, the controller may display the image object on the display unit when the electronic device body is in a first state according to the check result, and display the image object on the display unit after waiting until the electronic device body is converted into the first state when the electronic device body is in a second state according to the check result.

To achieve these and other advantages and in accordance with the purpose of this specification, as embodied and broadly described herein, there is provided an electronic note system including an electronic device and a touch tool capable of mutually performing a short-range wireless communication using wireless signals. Here, the touch tool may include an activation button to activate a color recognition function, and a color recognition unit to recognize a proximate color or a contacted color in correspondence with the color recognition function. The electronic device may include a wireless communication unit to receive color information corresponding to the recognized color by the color recognition unit via a wireless signal, and a controller to output an image object on a display unit using a color corresponding to the received color information, activate an electronic note function in response to a touch input applied onto the image object by the touch tool, and control the display unit to output information, which is input in response to a touch input applied onto the display unit after a screen is turned on when it is in an off state, if necessary, and the electronic note function is activated, with the color corresponding to the color information.

In one aspect of the present disclosure, the controller of the electronic device may recognize a plurality of color information as pattern information when the color recognition unit recognizes the plurality of color information while the activation button of the touch tool is pressed. Here, a visual appearance of the image object may be a pattern corresponding to the recognized pattern information.

In one aspect of the present disclosure, the controller of the electronic device may not generate a control command corresponding to a touch input when the corresponding touch input is applied onto the display unit by the touch tool while the activation button of the touch tool is pressed, and the touch tool may recognize by the color recognition unit a color output on a point to which the touch input is applied.

In one aspect of the present disclosure, the touch tool may further include a touch recognition unit. Here, the controller of the electronic device may set attribute information relating to the visual appearance of information input by a touch input applied onto the display unit, based on a user's touch input applied onto the touch recognition unit.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 5A to 5E and FIGS. 6A to 6E are conceptual views showing a method of entering an electronic note function in a lock state of the electronic device;

DETAILED DESCRIPTION OF THE INVENTION

Description will now be given in detail of an antenna device and an electronic device having the same according to the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Electronic devices described herein may include cellular phones, smart phones, laptop computers, digital broadcasting terminals, personal digital assistants (PDAs), portable multimedia players (PMPs), navigators, slate PCs, tablet PC, ultra books and the like. However, it may be easily understood by those skilled in the art that the configuration according to the exemplary embodiments of this specification can be applied to stationary terminals such as digital TV, desktop computers and the like excluding a case of being applicable only to the electronic devices.

Figure 1:
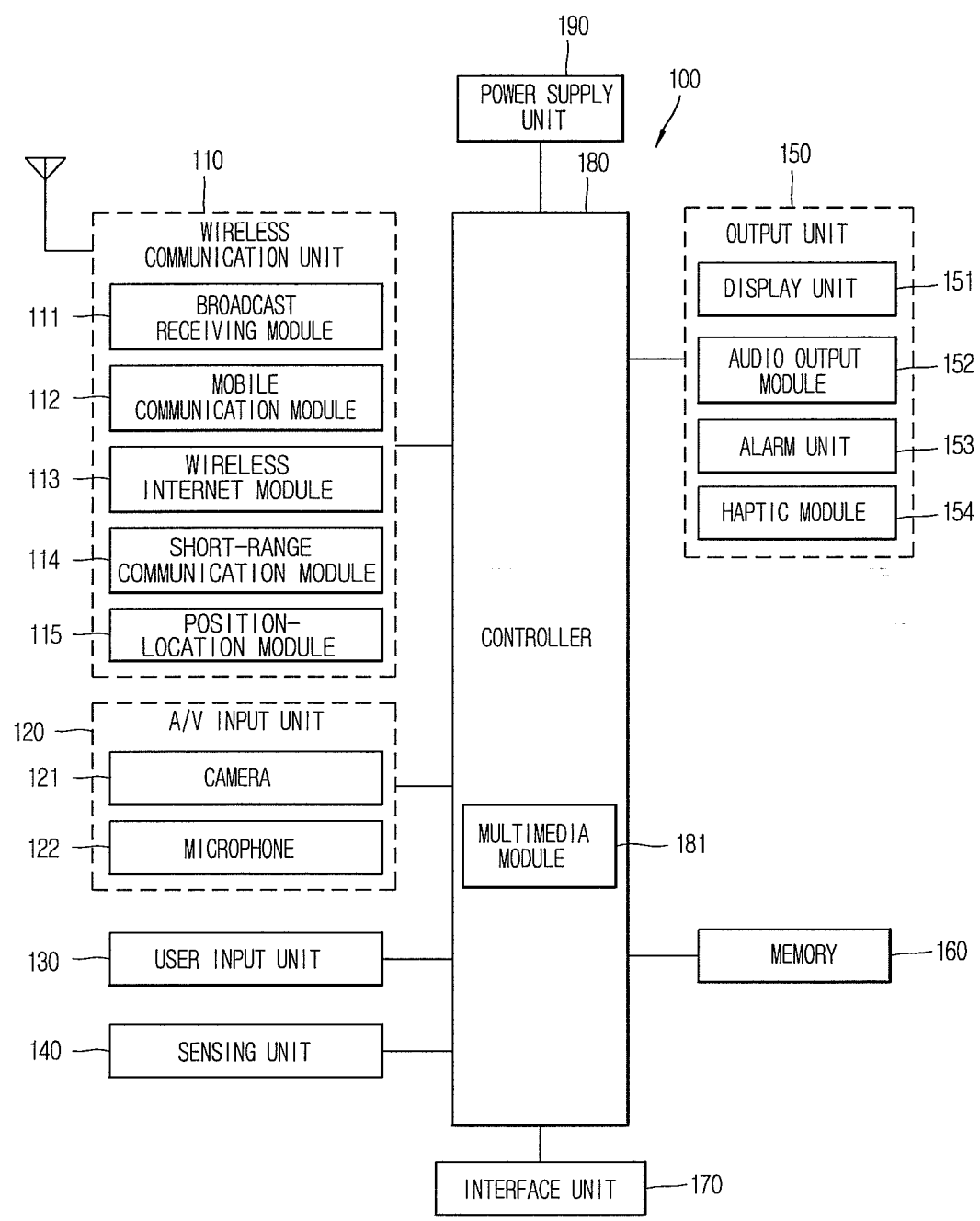
FIG. 1 is a block diagram of an electronic device in accordance with one exemplary embodiment.

FIG. 1 is a block diagram of an electronic device in accordance with one exemplary embodiment.

The electronic device 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the electronic device 100 having various components, but it is understood that implementing all of the illustrated components is not a requirement. Greater or fewer components may alternatively be implemented.

Hereinafter, each component is described in sequence.

The wireless communication unit 110 may typically include one or more modules which permit wireless communications between the electronic device 100 and a wireless communication system or between the electronic device 100 and a network within which the electronic device 100 is located. For example, the wireless communication unit 110 may include a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the electronic device. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the electronic device. This module may be internally or externally coupled to the electronic device 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, and the like.

The location information module 115 denotes a module for detecting or calculating a position of an electronic device. An example of the location information module 115 may include a Global Position System (GPS) module.

Referring to FIG. 1, the A/V input unit 120 is configured to provide audio or video signal input to the electronic device. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Two or more cameras 121 may be provided according to the configuration of the electronic device.

The microphone 122 may receive an external audio signal while the electronic device is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the electronic device. The user input unit 130 may include a keypad, a dome switch, a touchpad (e.g., static pressure/capacitance), a jog wheel, a jog switch and the like.

The sensing unit 140 provides status measurements of various aspects of the electronic device. For instance, the sensing unit 140 may detect an open/close status of the electronic device, a change in a location of the electronic device 100, a presence or absence of user contact with the electronic device 100, the location of the electronic device 100, acceleration/deceleration of the electronic device 100, and the like, so as to generate a sensing signal for controlling the operation of the electronic device 100. For example, regarding a slide-type electronic device, the sensing unit 140 may sense whether a sliding portion of the electronic device is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 152, an alarm unit 153 and a haptic module 154.

The display unit 151 may output information processed in the electronic device 100. For example, when the electronic device is operating in a phone call mode, the display unit 151 will provide a User Interface (UI) or a Graphic User Interface (GUI), which includes information associated with the call. As another example, if the electronic device is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the electronic device 100. For instance, a plurality of the displays 151 may be arranged on one surface to be spaced apart from or integrated with each other, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the electronic device 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the electronic device 100, e.g., sound alarming a call received or a message received, and so on. The audio output module 152 may include a receiver, a speaker, a buzzer, and so on.

The alarm unit 153 outputs signals notifying occurrence of events from the electronic device 100. The events occurring from the electronic device 100 may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output module 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the electronic device 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the electronic device 100 may operate a web storage which performs the storage function of the memory 160 on the Internet.

The interface unit 170 may generally be implemented to interface the electronic device with external devices. The interface unit 170 may allow a data reception from an external device, a power delivery to each component in the electronic device 100, or a data transmission from the electronic device 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the electronic device 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the electronic device 100 via a port.

Also, the interface unit 170 may serve as a path for power to be supplied from an external cradle to the electronic device 100 when the electronic device 100 is connected to the external cradle or as a path for transferring various command signals input from the cradle by a user to the electronic device 100. Such various command signals or power input from the cradle may operate as signals for recognizing that the electronic device 100 has accurately been mounted to the cradle.

The controller 180 typically controls the overall operations of the electronic device 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

Also, the controller 180 may execute a lock state, in which a user is restricted from inputting a control command for applications, when a state of the electronic device satisfies a preset condition. The controller 180 may control a lock screen, which is displayed in the lock state, based upon a touch input detected on the display unit 151 (hereinafter, referred to 'touch screen') in the lock state.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations.

The software codes can be implemented with a software application written in any suitable programming language. Also, the software codes may be stored in the memory 160 and executed by the controller 180.

Hereinafter, description will be given of the structure of the electronic device or a mobile terminal in accordance with the exemplary embodiment shown in FIG. 1.

Figure 2A:
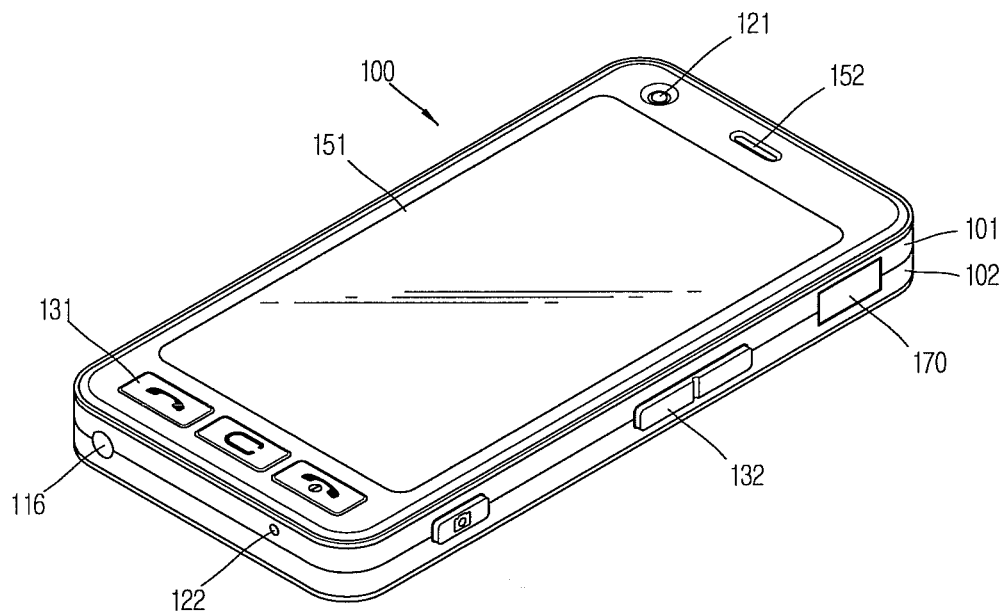
FIG. 2A is a front perspective view of the electronic device.
Figure 2B:
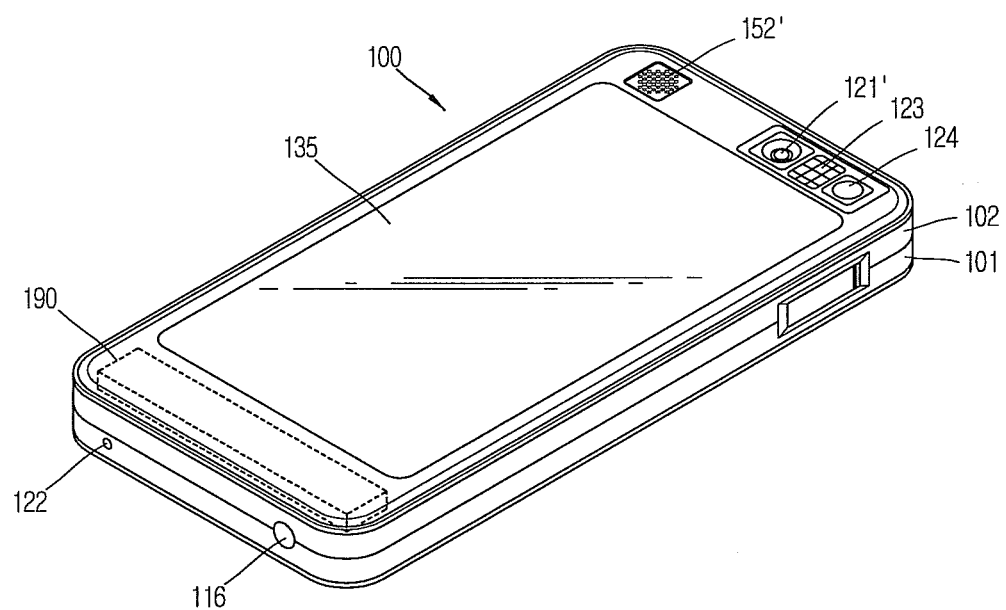
FIG. 2B is a rear perspective view of the electronic device.

FIG. 2A is a front perspective view showing an example of the electronic device or the mobile terminal, and FIG. 2B is a rear perspective of the electronic device of FIG. 2A.

The electronic device 100 disclosed herein is provided with a bar-type device body. However, the present application is not limited to this type of device, but is also applicable to various structures of devices such as slide type, folder type, swivel type, swing type, and the like, in which two or more bodies are combined with each other in a relatively movable manner.

As shown in FIGS. 2A and 2B, a device body (hereinafter, referred to as 'body') 100 may include a front surface, side surfaces and a rear surface. Also, the body may have both ends formed in a lengthwise direction.

The body may include a case (or referred to as casing, housing, cover, etc.) defining an appearance of the electronic device 100. In this exemplary embodiment, the case may be divided into a front face (hereinafter, referred to as 'front') case 101 and a rear face (hereinafter, referred to as 'rear case') 102. A space formed between the front and rear cases 101 and 102 may accommodate various electronic components. At least one intermediate case may further be disposed between the front and the rear cases 101 and 102.

Such cases may be injected using a synthetic resin or be formed of a metal, such as stainless steel (STS), titanium (Ti) or the like.

The front case 101 of the device body is shown having a display unit 151, an audio output module 152, a camera 121, a user input unit 130/131, 132, a microphone 122, an interface unit 170, and the like.

The display unit 151 may occupy most of a principal surface of the front case 101. The audio output module 152 and the camera 121 may be disposed near one of both end portions of the display unit 151, and the user input unit 131 and the microphone 122 on the other end portion of the display unit 151. The user input unit 131, the interface unit 170 and the like may be disposed on side surfaces of the front and rear cases 101 and 102. The microphone 122 may be disposed on the other end of the body 100.

The user input unit 130 may be manipulated to allow inputting of commands for controlling operations of the electronic device 100, and include a plurality of first manipulation units 131, 132. The plurality of manipulation units 131, 132 may be referred to as a manipulating portion. Such manipulating portion can employ any tactile manner that a user can touch or tap for manipulation.

The first and second manipulation units 131, 132 may be set to allow inputting of various contents. For example, the first manipulation unit 131 may be configured to input commands such as START, END, SCROLL or the like, and the second manipulation unit 132 may be configured to input commands, such as a volume adjustment of sounds output from the audio output module 152, conversion of the display unit 151 into a touch recognition mode, or the like.

Referring to FIG. 2B, an audio output module 152' may further be disposed at a rear face of the terminal body, namely, the rear case 102. The audio output module 152' can cooperate with the audio output module 152 (see FIG. 2A) to provide stereo output. Also, the audio output module 152' may be configured to operate as a speakerphone.

The rear case 102 of the terminal body may further be provided with a camera 121'. The camera 121' faces a direction which is opposite to a direction faced by the camera 121 (see FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed in the terminal body to be rotatable or popped up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

A power supply unit 190 for supplying power to the electronic device 100 may be mounted in the terminal body. The power supply unit 190 may be mounted in the terminal body or detachably coupled directly onto the outside of the terminal body.

The rear case 102 may be further provided with a touchpad 135 for detecting a touch input. Similar to the display module 210, the touchpad 135 may be implemented as a light-transmissive type. Here, if the display unit 151 is configured to output visual information from both surfaces, the visual information can be recognized through the touchpad 135. The information output from the both surfaces may all be controlled by the touchpad 135. Unlike to this, a display may further be mounted on the touchpad 135 so as to configure a touch screen even on the rear case 102.

The touchpad 135 may operate mutually in association with the display unit 151 of the front case 101. The touchpad 135 may be provided on the rear of the display unit 151 in parallel to each other. The touchpad 135 may have a size the same as or smaller than the size of the display unit 151.

Figure 2C:
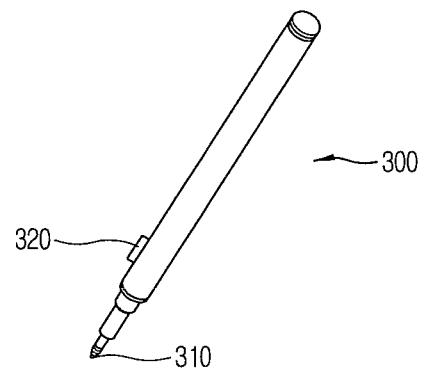
FIGS. 2C and 2D are conceptual views showing a touch tool, which allows for applying a touch input on the electronic device.

Meanwhile, the display unit 151 of the electronic device 100 may be sensitive to a touch input applied by a user's finger. In addition to a method of using a user's body, a touch input may be applied onto the display unit 151 by an external touch tool (means, instrument, etc.). FIG. 2C is a conceptual view of a touch tool for applying a touch input onto the electronic device according to the one exemplary embodiment.

As shown in FIG. 2C, a touch tool 300 may be an input tool in a shape of a pen for input on the touch-sensitive display unit 151, and be named as a touch pen or a stylus pen.

The touch tool 300 may apply a touch input onto the display unit 151 using at least one of an electrostatic capacity type touch scheme and a constant pressure type touch scheme according to an attribute of a touchpad included in the display unit 151.

Also, the touch tool 300 may include a color recognizing portion 310 having a color recognition sensor, an activation button 320 for activating the color recognizing portion 310, and a short-range communication module 330 for performing transmission and reception of wireless signals with the electronic device 100.

The color recognizing portion 310 may recognize a color of an object which is located near the color recognition sensor or approaches the color recognition sensor. The color recognizing portion 310 may transmit information related to a recognized color to the electronic device 100 via the short-range communication module 330 when the activation button 320 is pressed or touched by a user.

The short-range communication module 330 may communicate with the electronic device 100 according to at least one of various short-range communication methods, such as Bluetooth, Radio Frequency Identification (RFID), Zigbee, and the like.

Figure 2D:
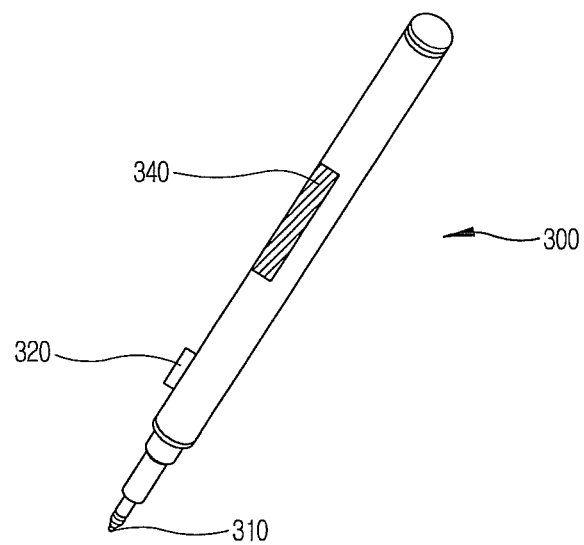

Referring to FIG. 2D, the touch tool 300 may further include a touch recognizing portion 340. In response to a user's touch input applied onto the touch recognizing portion 340, the touch tool 300 may change attribute information related to the recognized color information, and attribute information related to a visual appearance, such as a displayed thickness of information, which is input in response to a touch input applied onto the display unit 151. Here, the attribute information relating to the recognized color information may be associated with at least one of brightness and saturation.

The attribute information relating to the visual appearance, which changes by the touch recognizing portion 340, may be output on the display unit 151 of the electronic device 100.

In the meantime, the electronic device which may include at least one of those components described above may provide an electronic note function using color information input by the touch tool.

Here, an electronic note is one of applications installed in the electronic device, and is a function, which allows a user to input information or edit information stored in the memory 160. Therefore, the user may be able to input information on such electronic note via a touch input or the like using various colors according to user preferences. Also, the information input on the electronic note may be stored (saved) in the memory 160 or sent to the exterior depending on a user selection.

Hereinafter, description will be given in more detail of a method of utilizing the electronic note function based on reception of color information from the touch tool 300 shown in FIG. 2C, with reference to the accompanying drawings.

Figure 3:
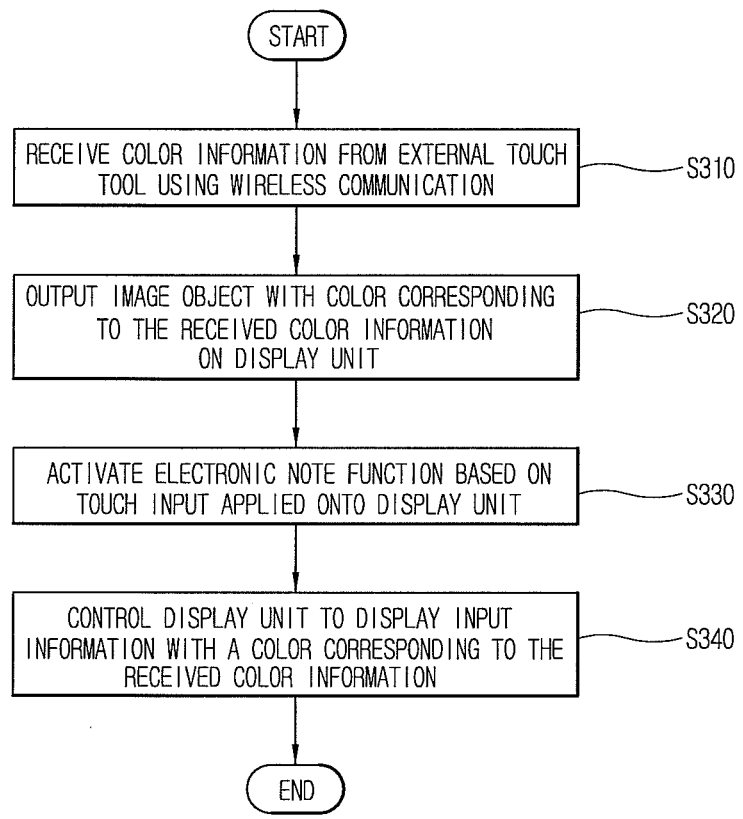
FIG. 3 is a flowchart showing a control method for an electronic device in accordance with one exemplary embodiment.
Figure 4A:
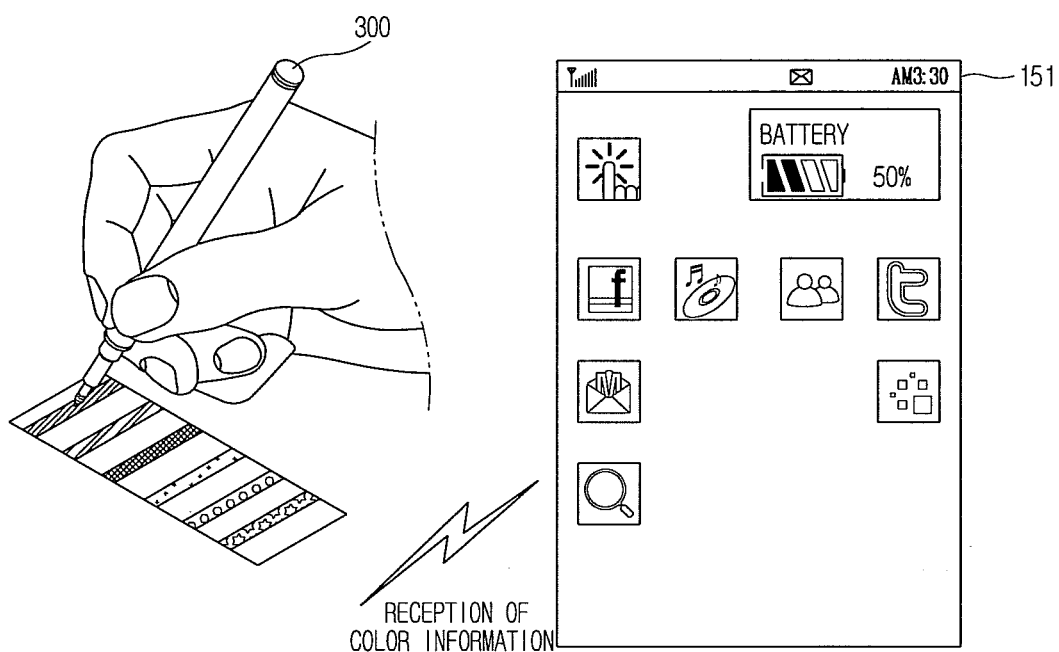
FIGS. 4A to 4E are conceptual views showing the control method for the electronic device shown in FIG. 3.

As shown in FIG. 3, the wireless communication unit 110 of the electronic device 100 may receive color information from an external touch tool via a wireless communication (S310). Here, the touch tool may be a touch pen or a stylus pen as shown in FIG. 2C. The touch tool, as shown in FIG. 4A, may recognize a specific color based on a user selection, and transmit color information corresponding to the recognized color to the electronic device 100.

As shown at the step S310, when the color information is received, the controller 180 of the electronic device 100 may output an image object, which is displayed with a color corresponding to the received color information, on the display unit 151 (S320, see FIG. 3).

Figure 4B:
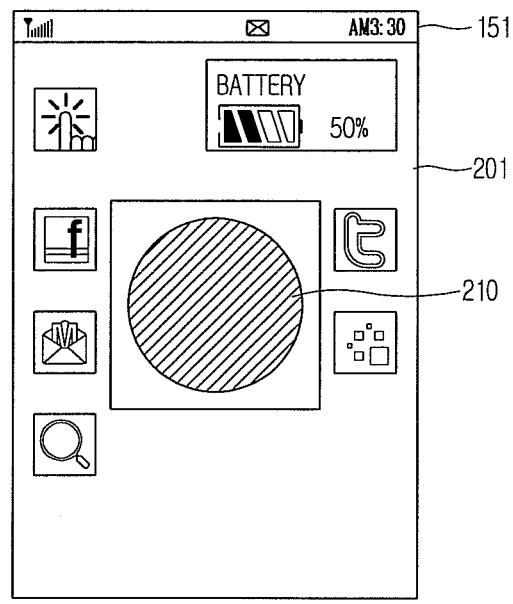

As shown in FIG. 4B, the image object 210 may be output with overlapping screen information, which was output on the display unit 151 prior to receiving the color information. Also, the image object 210 may be displayed with various shapes according to user settings or settings of the controller 180.

Next, when a touch input is applied by a user's finger or the touch tool onto the image object which is output on the display unit 151 with the color corresponding to the received color information, the controller 180 may activate the electronic note function (S330).

In the meantime, the case where the electronic note function is activated based on the touch input applied by the touch tool may be limited to a case where the user applies a touch input onto the image object with pressing a specific button (for example, the activation button 320, see FIG. 2C), which is provided at the touch tool.

Figure 4C:
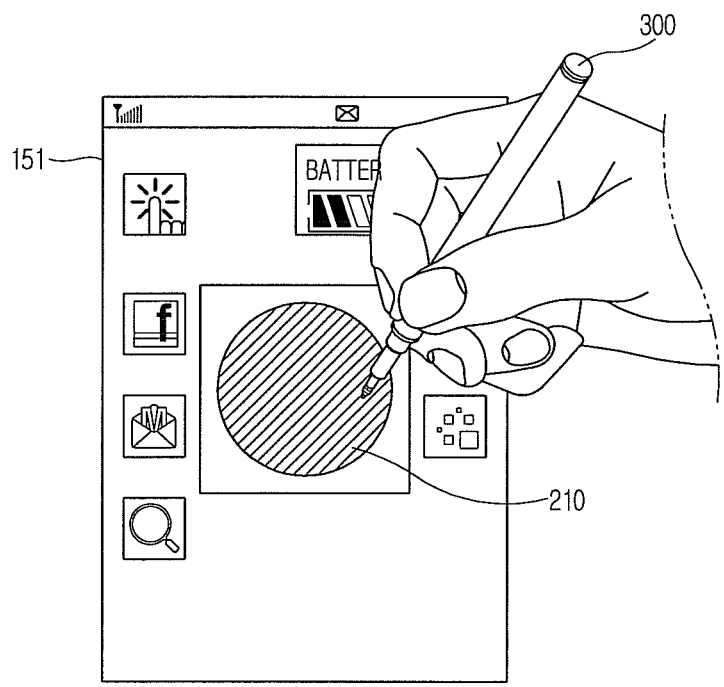
Figure 4D:
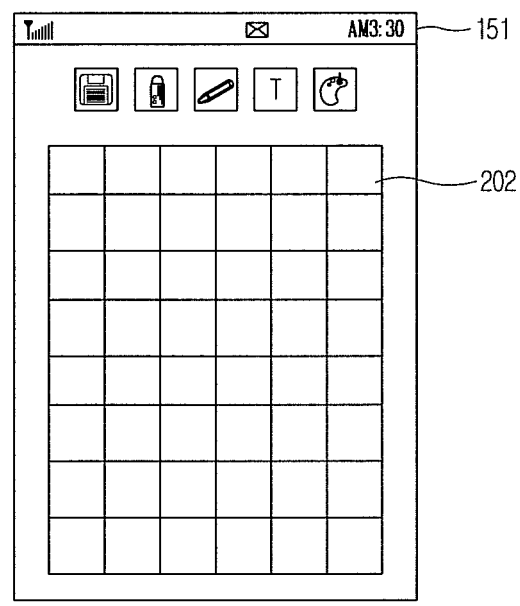

For example, as shown in FIGS. 4C and 4D, a touch input is applied using the touch tool 300 onto the image object 210 output on the display unit 151, the controller 180 may output an execution screen 200 of the electronic note function on the display unit 151, as shown in FIG. 4D.

Although not shown, the controller 180 may activate the electronic note function while continuously outputting screen information 201 (see FIG. 4B), which was output on the display unit 151 prior to activating the electronic note function. Here, information input in response to the touch input applied onto the display unit may be output with overlapping the screen information 201.

Although not shown, if the user does not want to execute the electronic note function immediately even though he or she has received the color information, the user may keep using the screen information output prior to recognition of the color information by way of touching a region where the image object 210 is not displayed. Here, the image object 210 may not be output on the display unit 151 any more.

In addition, when a touch input onto the image object 210 is not sensed for a predetermined time, the controller 180 may control the display unit 151 not to display the image object 210 thereon any more.

As such, in the electronic device according to the present disclosure, even when the electronic note function is not activated immediately, the color information received from the touch tool 300 may be stored in the memory 160, and the user may input information using the color corresponding to the received color information when executing the electronic note function later.

When information is input on the display unit 151 in response to a touch input applied onto the display unit 151 by the user's finger or the touch tool 300 after activating the electronic note function, the input information may be displayed with the color corresponding to the color information received from the touch tool (S340).

Figure 4E:
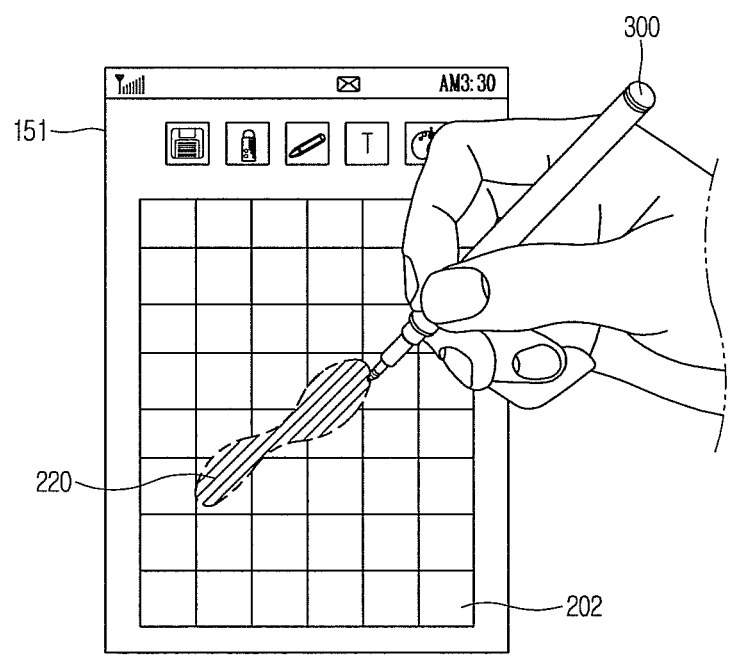

That is, as shown in FIG. 4E, the controller 180 may display information 220, which is input in response to the touch input applied onto the display unit 151, with the color corresponding to the received color information. Therefore, the user may be able to input information by use of the electronic note function as soon as selecting a desired color using the touch tool 300.

As described above, the electronic device according to this specification may provide the method for conveniently activating the electronic note function. Also, the electronic device may output the image object, which is displayed with the color corresponding to the received color information, on the display unit. This may allow the user to confirm in real time whether or not a color which the user desired to recognize has been correctly recognized.

Hereinafter, description will be given in more detail of a method of activating the electronic note function as soon as releasing a lock state of the electronic device when color information is received from an external touch tool in the lock state, with reference to the accompanying drawings. FIGS. 5A to 5E and FIGS. 6A to 6E are conceptual views showing a method of entering an electronic note function in a lock state of the electronic device according to the one exemplary embodiment.

Here, the lock state indicates a state that the user is restricted from inputting a control command with respect to applications installed in the electronic device. This is to prevent functions and applications of an electronic device, which has a touch screen (or the display unit 151 implemented as the touch screen), from being activated or deactivated due to an input of a control command undesired by the user. Hence, it may be possible in the lock state to restrict a control command from being input by the user via the touch screen (or the display unit 151) and other user input unit 130 within a preset range.

Meanwhile, the user's input of the control command is restricted in the locked state, but functions and applications of the electronic device which were being activated prior to execution of the lock state may be continuously executed.

An unlock (release) state indicates a state that the user's input of the control command with respect to the electronic device is not restricted. Therefore, in the unlock state, the functions and applications of the electronic device may be activated or deactivated according to a control command input by the user via the touch screen (or the display unit 151) or the user input unit 130.

Here, the unlock state may be executed when a user input with respect to the touch screen (or the display unit 151) and other user input unit 130 disposed on the electronic device is not sensed for a preset time. The preset time may change depending on user's settings. Also, the lock state may be executed when the user presses a specific key (for example, a hold key) disposed on the electronic device, which is preset for the lock state.

Figure 5A:
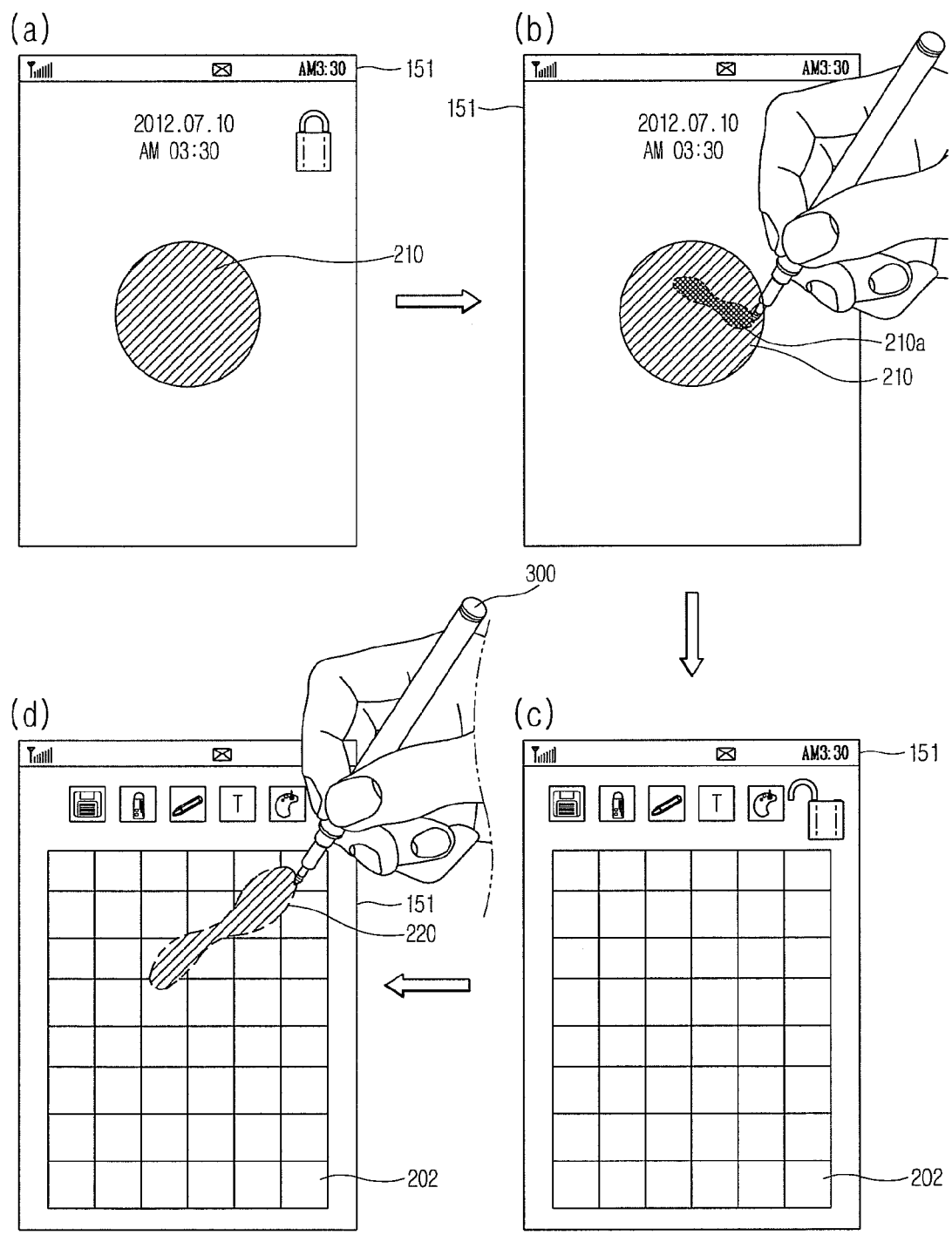

Accordingly, in the lock state, when color information is received from an external touch tool, the controller 180, as shown in FIG. 5A-A, may output an image object 210, which is displayed with a color corresponding to the received color information on a lock screen, which is displayed on the display unit 151 in the lock state. Also, when a preset type of touch input is applied as shown in FIG. 5A-B, the controller 180 may convert the lock state into the unlock state, as shown in FIG. 5A-C and FIG. 5A-D.

The controller 180 may activate the electronic note function as soon as converting the lock state into the unlock state. Therefore, an execution screen for the electronic note function may be output on the display unit 151.

As such, the electronic device may output an image object on a lock screen based on recognition of color information from the exterior, and activate an electronic note function as soon as converting a lock state into an unlock state using the displayed image object. Therefore, the user may be able to fast enter the electronic note function in the lock state.

Referring to FIG. 5B-A, when color information is received from the exterior in a deactivated state of the display unit 151, the controller 180 may output the image object on the lock screen of the display unit 151 in response to the reception of the color information.

Here, "the deactivated state of the display unit 151" indicates a state in which a lighting device (light) disposed within the display unit 151 for lighting it up is in a turn-off state. That is, in the deactivated state of the display unit 151, any information or graphic image may not be displayed on the display unit 151. On the contrary, "an activated state of the display unit 151" indicates a state in which the lighting device (or light) within the display unit 151 is in a turn-on state. Therefore, in this state, information may be output on the display unit 151.

As such, the electronic device according to the present disclosure may automatically convert the display unit from a deactivated state into an activated state in response to reception of color information, such that a user can recognize a color corresponding to the color information received from the exterior immediately on the display unit.

Figure 5C:
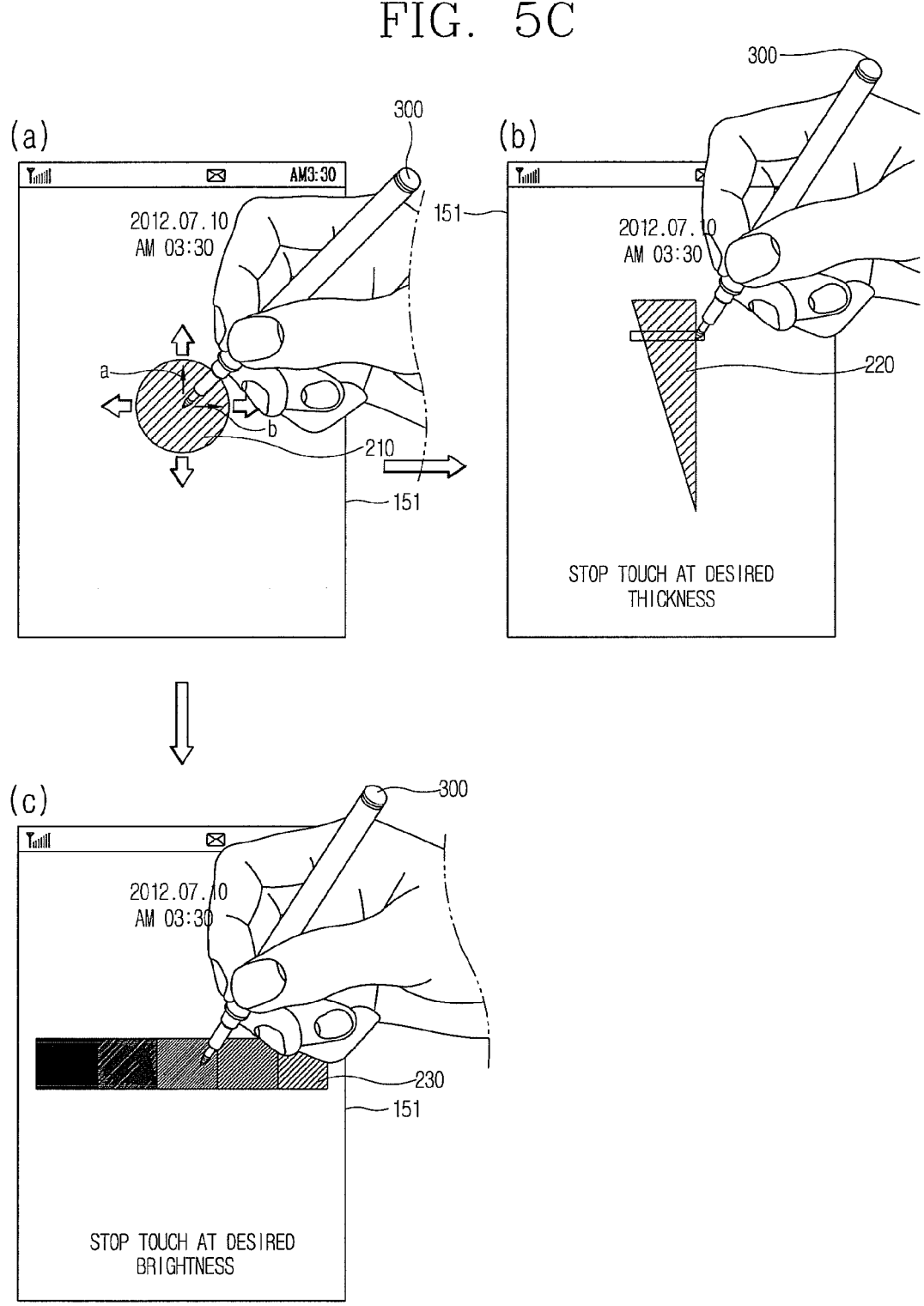

Referring to FIG. 5C, the electronic device may change attribute information related to a color corresponding to the received color information in response to a touch input applied onto the image object 210. Here, the attribute information may be information associated with at least one of brightness, saturation, and a displayed thickness of information, which is input by a touch input in an activated state of the electronic note function.

As one example of the method for changing the attribute information, referring to FIG. 5C, a guide image, by which different attribute information can change along a moving path of the touch input which starts from the image object 210, may be output.

For example, as shown in FIG. 5C-A and FIG. 5C-B, when a touch input starting from one point on the image object 210 moves in a direction 'a', then the controller 180 may provide a guide image 220 for changing the displayed thickness.

As shown in FIG. 5C-A and FIG. 5C-C, when the touch input starting from one point on the image object 210 moves in a direction 'b', then the controller 180 may provide a guide image 230 for changing the brightness.

As such, the controller 180 may change the attribute information along the moving path of the touch input starting from the image object 210. Also, the guide images 220, 230 associated with the attribute information may be output on the display unit 151 such that the user can identify the attribute information changed according to the motion of the touch input. The controller 180 may also select attribute information corresponding to a point where the touch input is released on the guide image 220, 230.

Figure 5D:
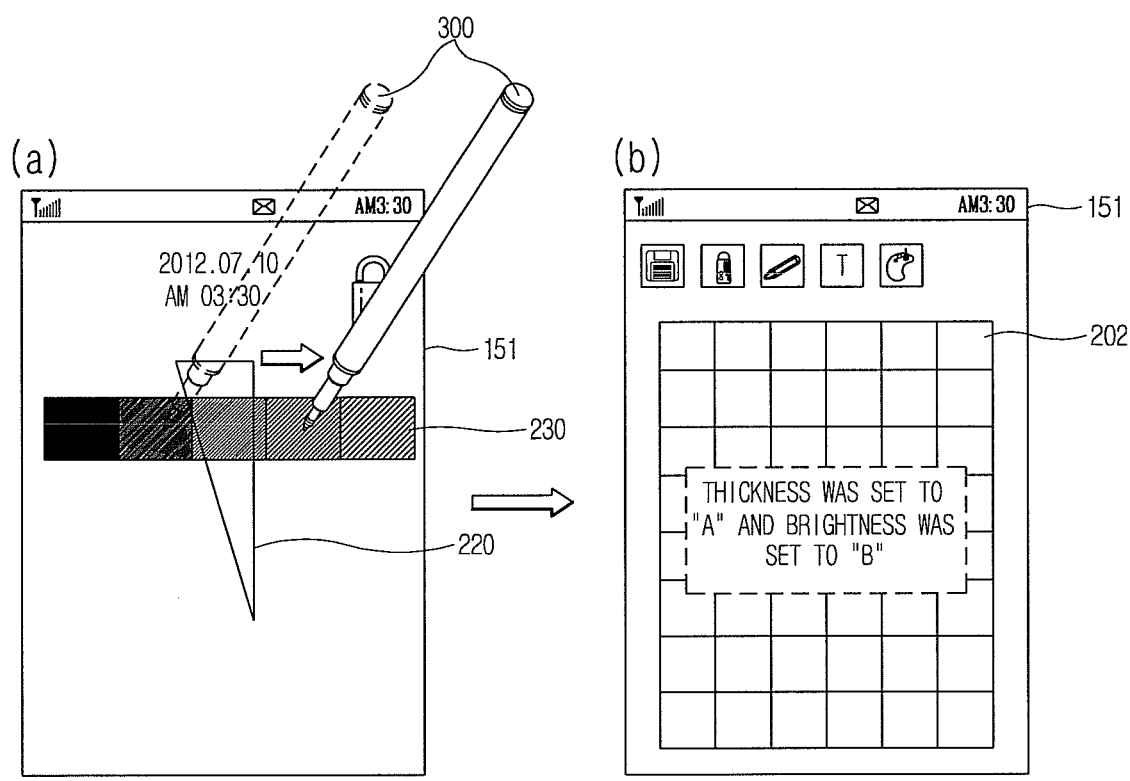

Referring to FIG. 5D, the controller 180 may set a plurality of attribute information in a sequential manner. For example, as shown in FIG. 5D-A, the user may select a displayed thickness by moving the touch input in the direction 'a', and sequentially change brightness by converting the moving path of the touch input into the direction 'b'.

Figure 5E:
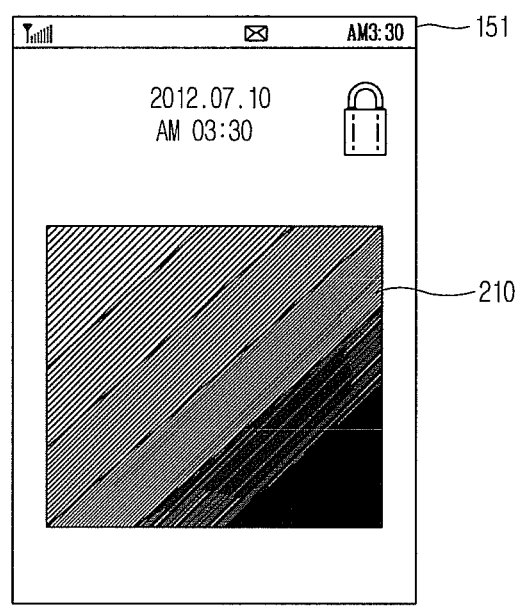

Referring to FIG. 5E, the controller 180 may display the image object 210 with a plurality of colors corresponding to different attribute information values so as to change the attribute information by applying a touch input onto one point of the image object 210.

Meanwhile, the method of changing the attribute information using the image object displayed in the lock state has been illustrated with reference to FIGS. 5C, 5D and 5E, but this method may be equally applied to an image object displayed in an unlock state.

As described above, the electronic device may display an image object in response to reception of color information from the exterior, so as to provide a user with information relating to a color recognized by an external touch tool and allow the user to set attribute information using the image object in a convenient manner.

Also, the method of displaying the image object in the lock state and converting the lock state into the unlock state in response to the preset type of touch input with respect to the image object has been illustrated with reference to FIG. 5A. Hereinafter, description will be given in more detail of examples of the preset type of touch input with respect to the image object for converting the lock state into the unlock state.

Figure 6A:
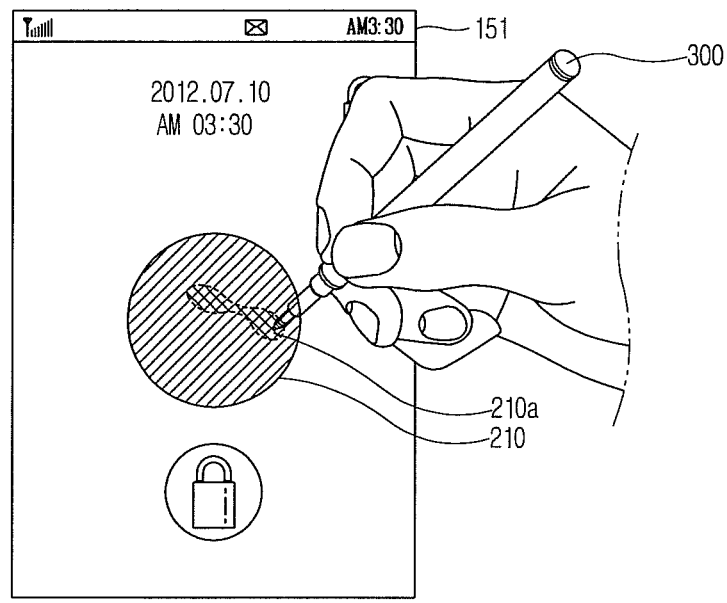

First, as one example, referring to FIG. 6A, when a strength of a touch input, which is applied onto the image object 210 displayed in the lock state in response to color information received from the exterior, is more than a reference value, the controller 180 may convert the lock state into the unlock state. For example, when a region 210a more than n % of the image object 210 is touched by the user, the lock state may be converted into the unlock state.

When a touch input is applied onto the image object 210, the controller 180 may activate the electronic note function at the moment of the conversion from the lock state into the unlock state. Also, when a touch input corresponding to a general unlock method, other than the touch input onto the image object 210, is applied, the electronic note function may not be activated. That is, in this case, a home screen page may be output on the display unit 151.

Figure 6B:
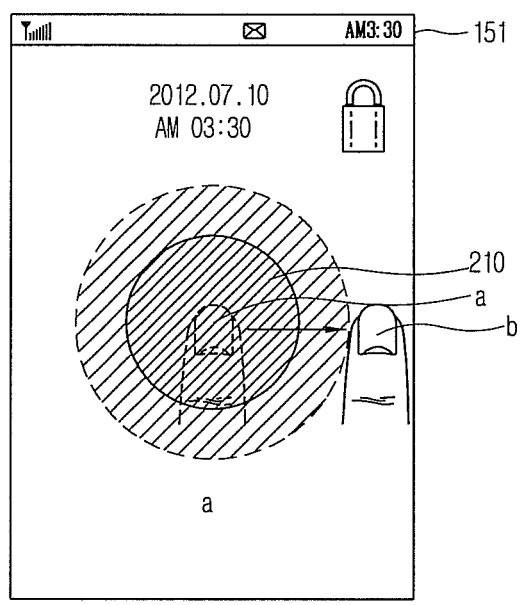

As another example, referring to FIG. 6B, when a touch input applied onto the image object 210 in one direction (e.g., a→b) is moved by more than a reference length, the controller 180 may convert the lock state into the unlock state.

Figure 6C:
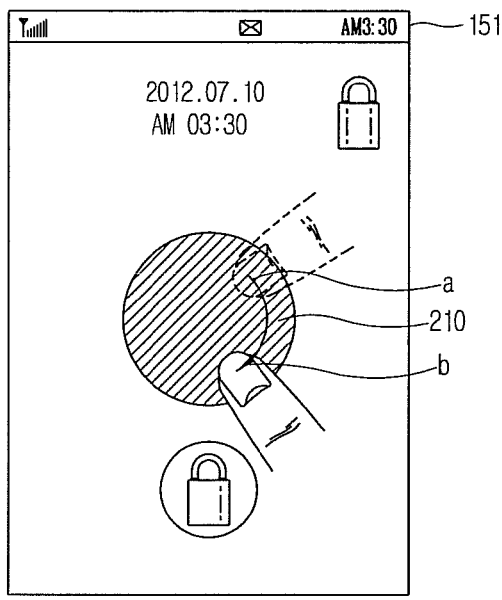

As another example, referring to FIG. 6C, when a touch input onto the image object 210 has a rotation path in a preset direction, the controller 180 may convert the lock state into the unlock state.

Figure 6D:
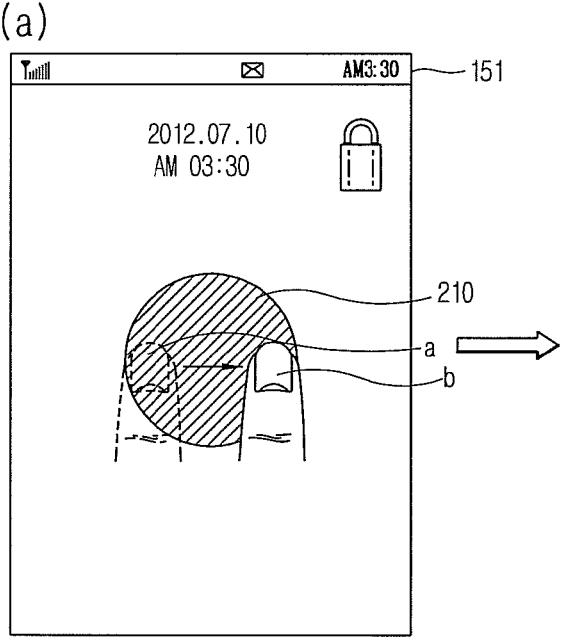
Figure 6D:
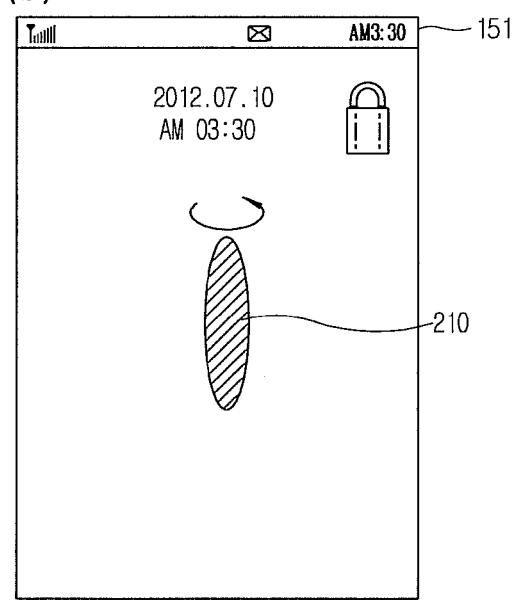

As another example, referring to FIG. 6D, the controller 180 may convert the lock state into the unlock state in response to a flicking touch input applied onto the image object 210. Here, as shown in FIG. 6D-A and FIG. 6D-B, the controller 180 may rotate the image object 210 to correspond to the direction that the flicking touch input is applied, so as to notify the user that the flicking touch input has been detected.

Figure 6E:
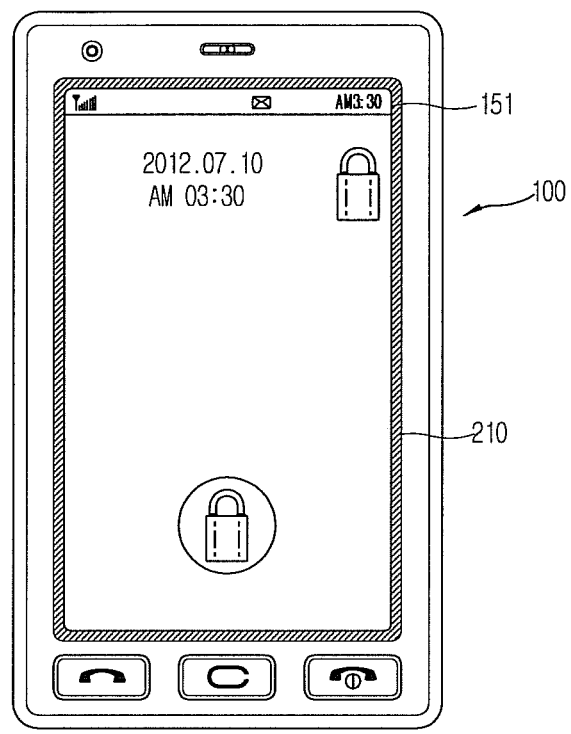

As another example, referring to FIG. 6E, the controller 180 may display the image object 210, which is displayed with the color corresponding to the color information received from the exterior, on an edge region of the display unit 151. The controller 180 may then convert the lock state into the unlock state in correspondence with a pattern that a touch tool (not shown) moves between the display unit 151 and a bezel region surrounding the display unit 151.

Here, the touch tool may be able to recognize that it has moved between the display unit and the bezel region, and transmit the recognized signal to the controller 180 of the electronic device 100. Therefore, when a motion pattern of the touch tool corresponding to the signal received from the touch tool matches a preset reference, the controller 180 may convert the lock state into the unlock state. Here, the touch tool may determine whether it is currently located on the display unit or on the bezel region based on the image object 210 displayed on the edge region of the display unit.

As described in the examples, the electronic device may convert the lock state into the unlock state in response to various types of touch inputs applied onto the image object, and thereafter fast execute the electronic note function.

Figure 7A:
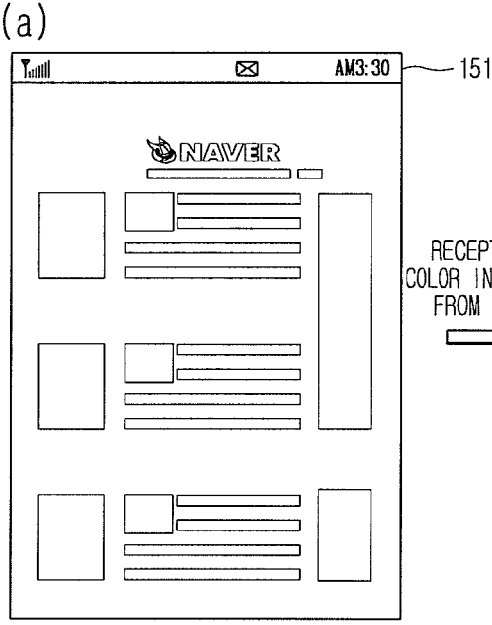
FIGS. 7A and 7B are conceptual views showing a method of entering an electronic note function in an unlock (release) state of the electronic device.
Figure 7A:
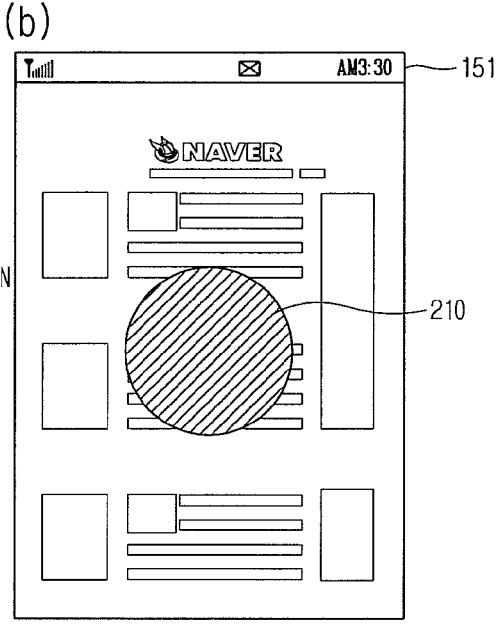
Figure 7A:
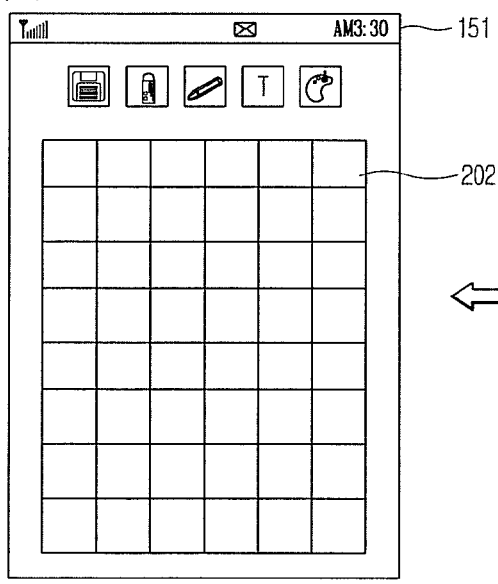
Figure 7A:
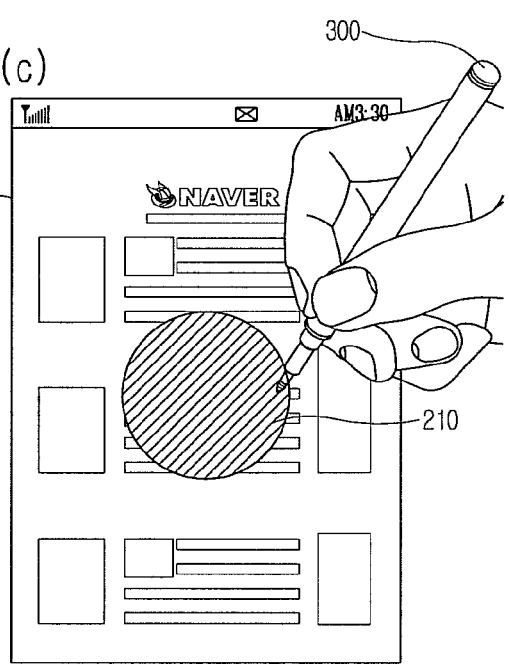
Figure 7B:
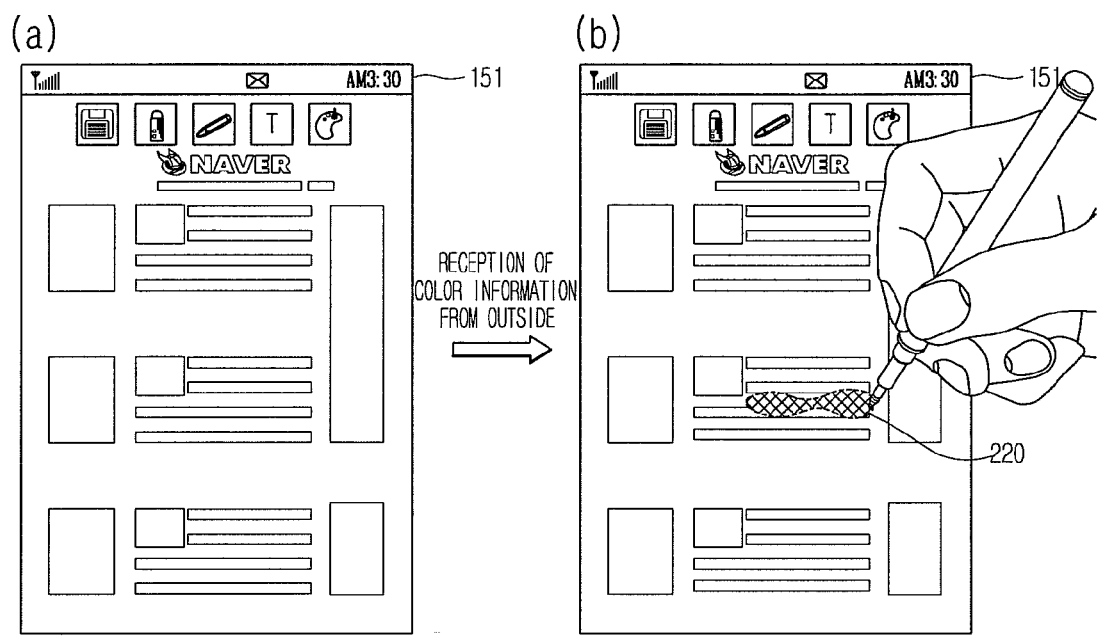

The foregoing embodiments have illustrated the method of displaying the color information on the lock screen when the color information is received from the external touch tool in the lock state. Hereinafter, description will be given in more detail of a method of activating the electronic note function when color information is received from the exterior in a state that screen information relating to the electronic device is displayed in an unlock state. FIGS. 7A and 7B are conceptual views showing a method of entering an electronic note function in an unlock (release) state of the electronic device.

As shown in FIG. 7A-A, when external color information is received in a state that specific screen information is displayed on the display unit 151, the controller 180 may output an image object 210 with a color corresponding to the received color information on the screen information which has been output on the display unit 151 prior to reception of the color information, as shown in FIG. 7A-B. As shown in FIG. 7A-C, when a touch input is applied onto the image object 210, the controller 180 may activate the electronic note function and output an execution screen of the electronic note function on the display unit 151, as shown in FIG. 7A-D.

As another example, as shown in FIG. 7B-A and FIG. 7B-B, the controller 180 may activate the electronic note function with continuously outputting the screen information which has been output on the display unit 151 prior to the activation of the electronic note function. Here, information input in response to a touch input onto the display unit 151 may be output with overlapping the screen information.

Although not shown, when the user does not desire to execute the electronic note function immediately even though the color information is received, the user may keep using the screen information output prior to recognition of the color information by way of touching a region where the image object 210 is not displayed. Here, the image object 210 may not be output on the display unit 151 any more.

In addition, when a touch input applied onto the image object 210 is not sensed for a preset time, the controller 180 may control the display unit 151 not to display the image object 210 thereon any more.

So far, the examples of receiving one color information from the exterior have been illustrated. Hereinafter, description will be given in more detail of a method for utilizing the electronic note function in response to reception of a plurality of color information, with reference to the accompanying drawings. FIGS. 8A to 8D are conceptual views showing one exemplary embodiment when a plurality of color information are received in the electronic device.

Figure 8A:
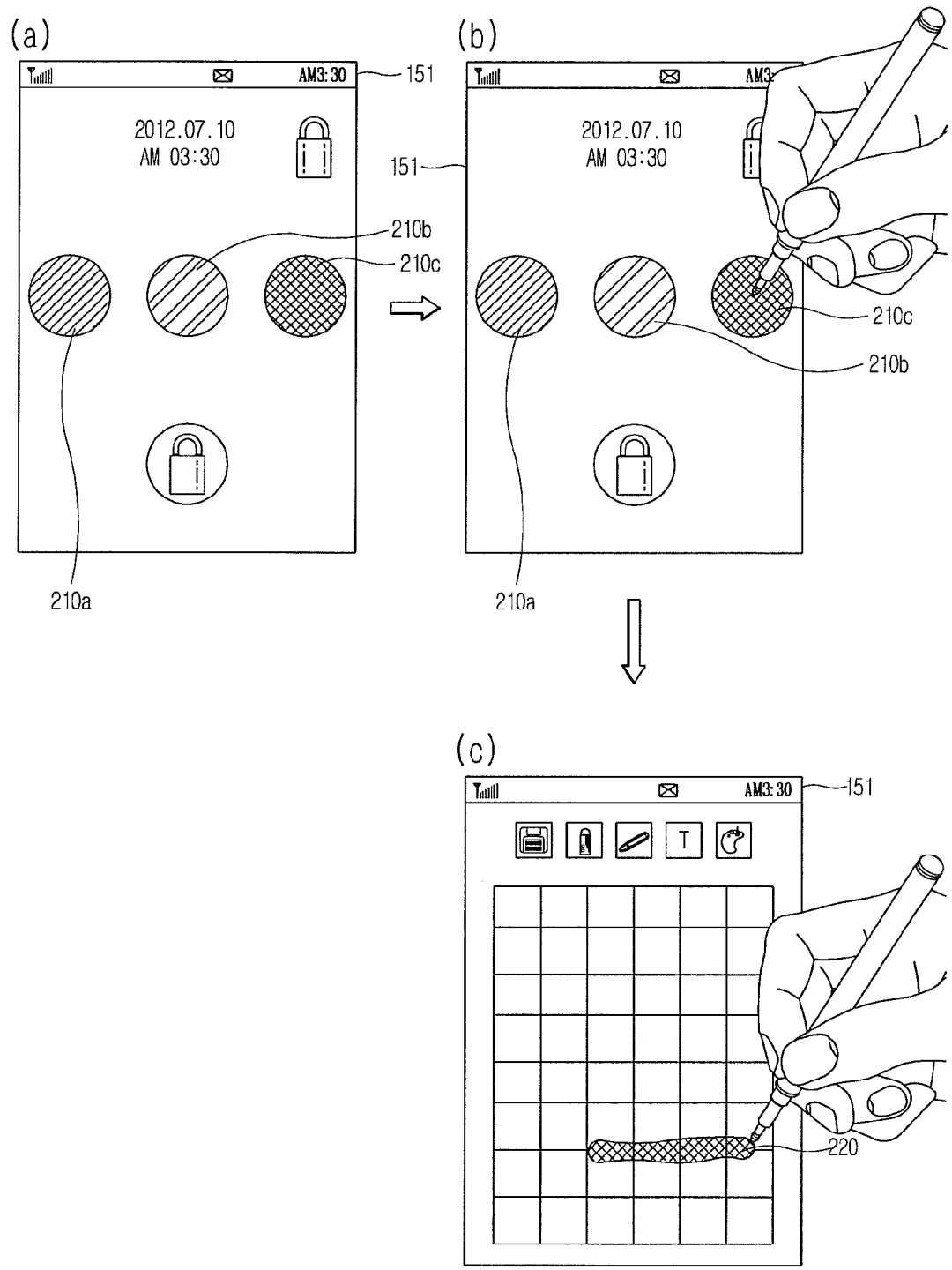
FIGS. 8A to 8D are conceptual views showing one exemplary embodiment when a plurality of color information are received in the electronic device.
Figure 8B:
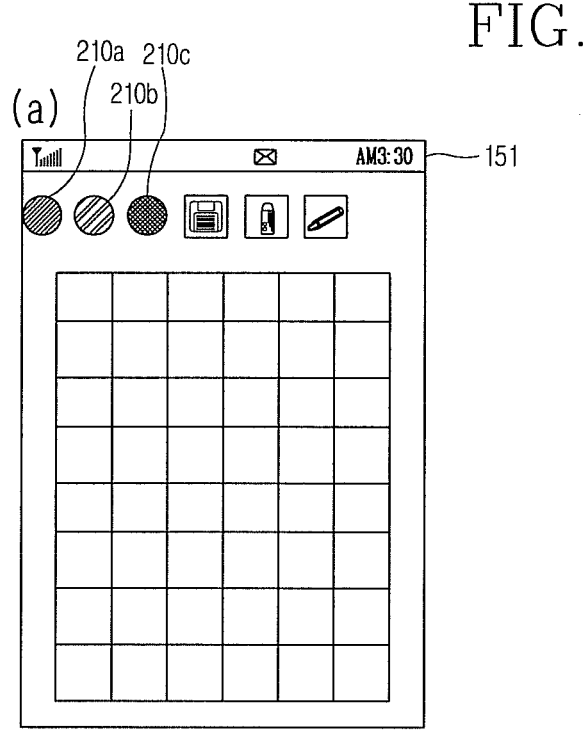

First, as shown in FIG. 8A, when a plurality of color information are received from the exterior, the controller 180 may output a plurality of image objects 210*a*, 210*b* and 210*c*, which are displayed with colors corresponding to the plurality of color information, on the display unit 151. As shown in FIG. 8A-B, in response to a user's touch input or a wireless signal received from an external touch tool, the controller 180 may select at least one image object, which corresponds to a color to be used for the electronic note function, from the plurality of image objects 210*a*, 210*b* and 210*c*. The controller 180 may display the selected image object to be distinguishable from the other image objects. Here, the user may select a color to be actually used from the plurality of color information. Therefore, when an unnecessary color is recognized by the touch tool 300 (see FIG. 2), the user may exclude the color.

In the meantime, the user may recognize a plurality of colors in a manner of recognizing a first color after pressing the activation button 310 disposed on the touch tool 300, releasing the activation button 310, and thereafter pressing the activation button 310 again. Here, a time interval for pressing or releasing the activation button 310 may be preset. The controller 180 may recognize the reception of the plurality of color information only when the plurality of color information are received from the touch tool 300 in a consecutive manner within the preset time interval.

Figure 8C:
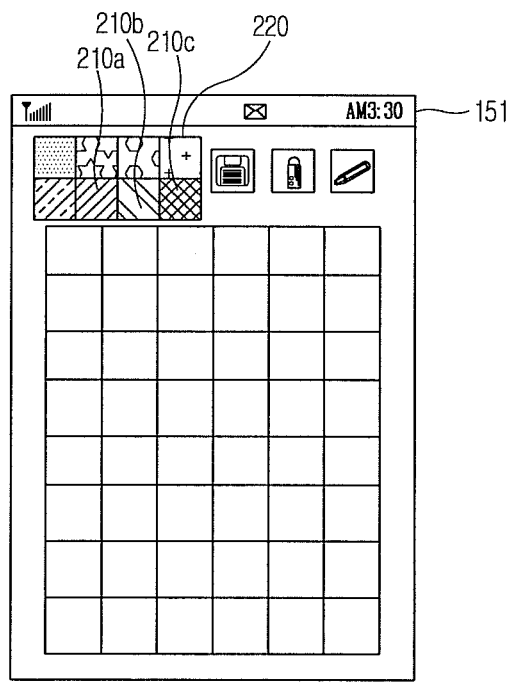

As shown in FIG. 8A-B and FIG. 8A-C, the controller 180 may display information input by a touch input, by using a color corresponding to the last received color information from the touch tool.

Also, the controller 180 may display information using a color, which is selected by a user using a touch tool or a touch input, in addition to the method of displaying information using the color corresponding to the last received color information.

The controller 180, as shown in FIG. 8B, may display the plurality of image objects 210*a*, 210*b* and 210*c*, which correspond to the plurality of color information received from the exterior, on one region of the display unit 151 in the activated state of the electronic note function. Therefore, the user may touch one of the plurality of image objects 210*a*, 210*b* and 210*c* displayed on the one region, changing a color of information to be displayed in response to the touch input. The controller 180, as shown in FIG. 8C, may also display a color corresponding to color information stored in the memory 160, as well as the colors corresponding to the plurality of color information received. Although not shown, the controller 180 may display the colors corresponding to the plurality of color information received to be distinguishable from the colors corresponding to the stored color information.

Figure 8D:
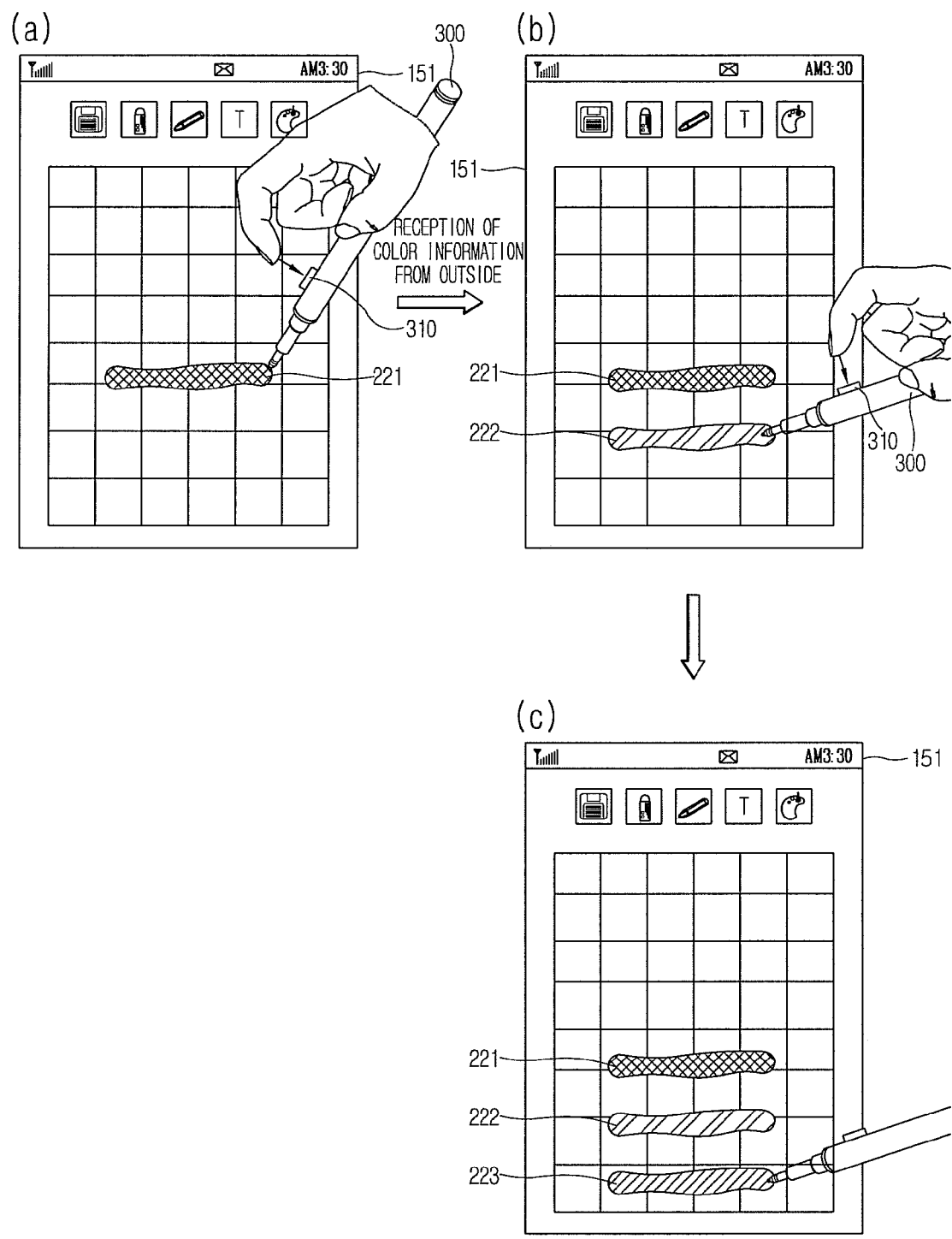

The controller 180, as shown in FIG. 8D, may change the color that displays information based on a wireless signal received from the touch tool. That is, in the activated state of the electronic note function, the controller 180 may change a color to display information, which is output in correspondence with a touch input applied onto the display unit 151, into a color corresponding to one of the plurality of color information received.

For example, while information is displayed with a first color in response to a touch input applied using the touch tool 300, when the activation button 310 of the touch tool 300 is selected, the touch tool 300 may transmit a wireless signal to the electronic device 100. The controller 180 may then change a display color from the currently selected color into another color based on the received wireless signal. Therefore, as shown in FIGS. 8D-A, 8D-B and 8D-C, the controller 180 may change the display color based on the activation button 310 being selected by the user. Therefore, the user may easily change the display color even without applying a separate touch input onto one region of the display unit for setting color information.

Although not shown, the touch tool 300 may also recognize one of colors constructing screen information output on the display unit 151 as well as recognizing a color of an object which is located at the outside of the electronic device. Here, the controller 180 may distinguish a touch input, which is applied onto the display unit 151 by the touch tool 300 to input a control command, from a touch input, which is applied onto the display unit 151 by the touch input 300 to recognize a color output on the display unit 151. For example, when a touch input is applied onto the display unit 151 with the activation button 310 of the touch tool 300 being pressed, the controller 180 may determine it as a touch input for recognizing the color output on the display unit 151, and may not generate a control command corresponding to the touch input. On the contrary, when a touch input is applied onto the display unit 151 without the activation button 310 of the touch tool 300 being pressed, the controller 180 may determine it as a touch input for inputting a control command, and generate a control comment corresponding to the touch input.

In the meantime, in addition to a color table (or color palette) 220 shown in FIG. 8C, the controller 180 may output a memo or an image stored in the memory 160 and an execution screen of an application on a separate output window or one region of the display unit 151, based on a user selection. This may thusly allow the touch tool 300 to recognize a new color from screen information output on the separate output window or the one region of the display unit 151. When the new color is recognized by the touch tool 300, the touch tool 300 may transmit a wireless signal to the electronic device 100. The controller 180 may change a display color to be used in the electronic note function from the currently selected color into a color corresponding to the wireless signal, namely, the color recognized by the touch tool 300, based on the received wireless signal.

The application corresponding to the screen information output on the separate output window or the one region of the display unit 151 may be an application, which is being multitasked with the electronic note application, a recently executed application or an application selected by a user.

In response to a user selection, the memo or image (or photo) stored in the memory 160 or the execution screen of the application may be output on a region where the color palette 220 (see FIG. 8C) is displayed, or the electronic note application may be output on one region of a display area of the display unit 151 and the memo or image (or photo) stored in the memory 160 or the execution screen of the application may be output on another region of the display area in a distinguishable manner.

Figure 9:
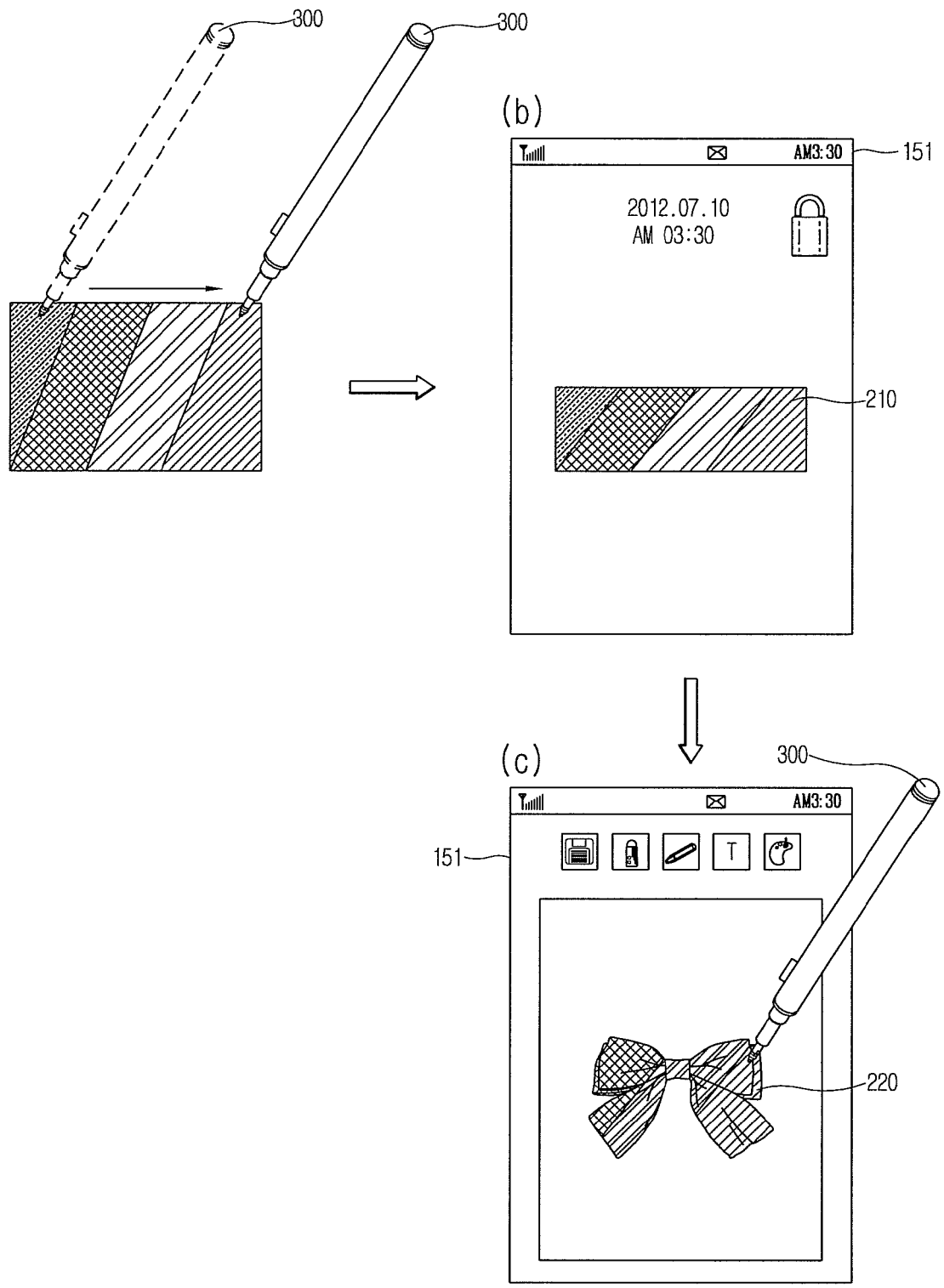
FIG. 9 is a conceptual view showing a method of recognizing pattern information in the electronic device.

Hereinafter, description will be given in more detail of a method of recognizing pattern information including a plurality of colors using a touch tool, with reference to the accompanying drawings. FIG. 9 is a conceptual view showing a method of recognizing pattern information in the electronic device.

As shown in FIG. 9A, the user may move the touch tool 300 to be close to or contact an object in which a plurality of color information are included, acquiring pattern information by use of the touch tool 300. For example, when it passes an object including a plurality of color information while the user selects the activation button for color recognition, the touch tool 300 may recognize the plurality of color information as a pattern. The touch tool 300 may transmit the touch information to the electronic device 100. Accordingly, on the display unit 151 of the electronic device 100, as shown in FIG. 9B, may be output an image object 210 corresponding to the received pattern information. The controller 180, as shown in FIG. 9C, may control the display unit 151 such that input information 220 can have visual information corresponding to the pattern information, in the activated state of the electronic note function.

As described above, the electronic device according to the present disclosure may provide various user interfaces by recognizing patterns other than a monochromic color.

Figure 10A:
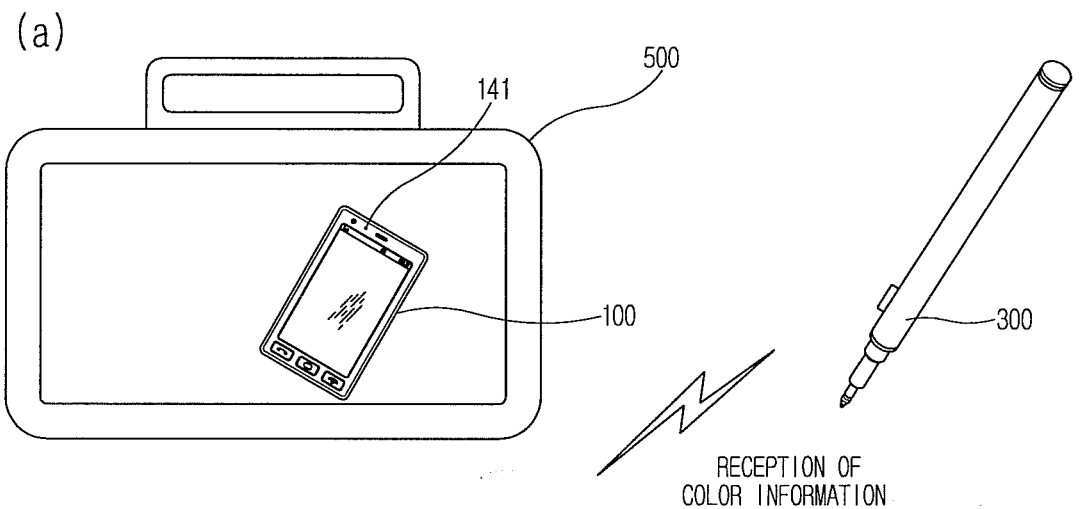
FIGS. 10A and 10B are conceptual views showing a method of using a proximity sensor in the electronic device.
Figure 10A:
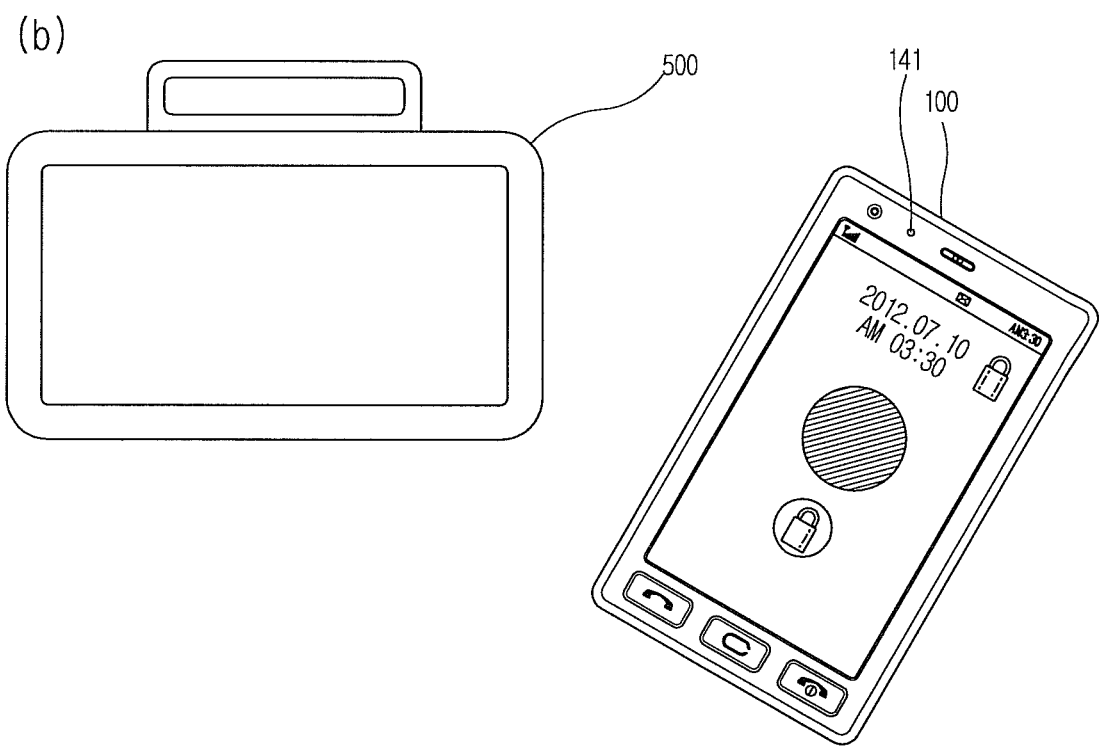
Figure 10B:
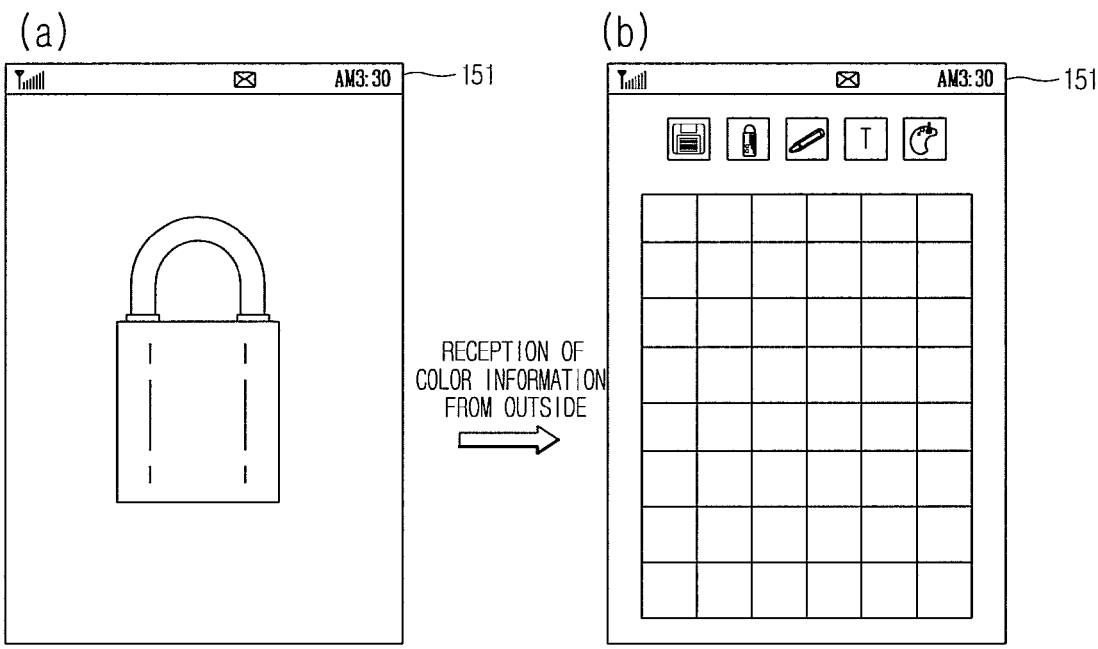

Hereinafter, description will be given in more detail of a method of controlling an electronic note function according to a position of the electronic device by using a proximity sensor or another sensor provided in the electronic device. FIGS. 10A and 10B are conceptual views showing a method of using a proximity sensor in the electronic device.

For example, as shown in FIG. 10A-A, when the electronic device is located at a position, such as in a bag 500 or a pocket, at which the user is currently unable to check information displayed on the display unit 151, the controller 180 may not immediately display a color corresponding to color information received from the exterior, but rather display information after waiting until the user is able to check the information displayed on the display unit 151, as shown in FIG. 10A-B.

As such, position information relating to the electronic device may be recognized through location coordinates recognized via the proximity sensor 141, GPS, Wi-Fi or the like. Also, the position information (or situation information) relating to the electronic device may be recognized through a light sensor. When color information is received from the external touch tool 300, the controller 180 may check a state of the electronic device body using the proximity sensor 141.

When the electronic device body is in a first state that the user is able to check information displayed on the electronic device, the controller 180 may display an image object corresponding to the color information received on the display unit 151. When the electronic device body is in a second state that the user is unable to check information displayed on the electronic device, the controller 180 may output the image object on the display unit after waiting until the state of the device body is converted into the first state.

This may allow the user to be provided with the received color information at the time point of being able to view the information, and also prevent the electronic device from consuming energy due to unnecessarily displaying information when the user is unable to check the display unit.

Meanwhile, as shown in FIGS. 10B-A and 10B-B, when the device body is in the first state, the controller 180 may automatically convert a lock state into an unlock state even if the user does not input a control command for converting the lock state into the unlock state, and thereafter immediately output an execution screen corresponding to the electronic note function on the display unit. This may allow the user to use the electronic note function more quickly.

Consequently, the electronic device according to the present disclosure may be configured to recognize the situation that the user is able to check information, thereby avoiding the situation that the user is unable to check information.

As described above, in an electronic device and a control method thereof according to one exemplary embodiment of the present disclosure, color information may be received from an external touch tool having a color recognition function via a wireless signal. This may allow the user to utilize an electronic note function using various colors even when those colors are not previously stored in the electronic device.

In addition, in the electronic device and the control method thereof according to the one exemplary embodiment of the present disclosure, an electronic note function may be quickly activated in response to a touch input applied onto an image object corresponding to color information received from an external touch tool.

Further, in accordance with one embodiment of the present disclosure, the method can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the electronic device.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An electronic device comprising:
a wireless communication unit to wirelessly receive color information from a touch tool;
a display unit configured to be touch sensitive;
a controller configured to:
display an image object with a color corresponding to the color information in response to receiving the color information from the touch tool,
wherein when a first color is recognized by the touch tool, the color information includes information related to the first color and the image object is displayed in the first color, and
wherein when a second color different from the first color is recognized by the touch tool, the color information includes information related to the second color and the image object is displayed in the second color,
receive a touch input with respect to the displayed image object, and to activate an electronic note function in response to the touch input applied to the image object,
wherein the controller controls the display unit to display information with the color corresponding to the color information, and the information is input to the electronic device based on a touch input applied to the display unit after activation of the electronic note function.

2. The electronic device of claim 1, wherein the controller controls the display unit to overlap the image object on screen information displayed on the display unit prior to receiving the color information from the touch tool, and wherein the controller activates the electronic note function in response to the touch tool touching the image object.

3. The electronic device of claim 1, wherein the controller controls the display unit to display the image object on a lock screen when the color information is received while the display unit is in a lock state that restricts an input of a control command with respect to an application.

4. The electronic device of claim 3, wherein when the display unit is in a deactivated state when receiving the color information, the controller displays the image object on the lock screen after activating the display unit.

5. The electronic device of claim 3, wherein in response to a specific touch input applied to the displayed image object, the controller changes the lock state of the display unit to an unlock state of the display unit.

6. The electronic device of claim 5, wherein in response to the controller changing the display unit to the unlocked state, the controller displays, on the display unit, an execution screen corresponding to the electronic note function.

7. The electronic device of claim 1, wherein in response to receiving a plurality of color information from the touch tool, the controller displays, on the display unit, a plurality of image objects with colors corresponding to the plurality of color information, respectively.

8. The electronic device of claim 7, wherein in response to receiving a wireless signal from the touch tool, the controller to select at least one color information to be used in the electronic note function from the plurality of color information, and the controller controls the display unit to display an image object corresponding to the selected color information such that the image object is distinguishable from the other image objects displayed on the display unit.

9. The electronic device of claim 7, wherein the controller displays information input by the touch input using a color corresponding to a last color information from the touch tool of the plurality of color information.

10. The electronic device of claim 9, wherein the controller changes a color information, displayed in response to a touch input applied to the display unit, into a color corresponding to one of the plurality of color information, in an active state of the electronic note function, based on the wireless signal received from the touch tool.

11. The electronic device of claim 1, wherein in response to a touch input applied to the image object, the controller changes attribute information relating to a color corresponding to the color information, and wherein the attribute information corresponds to one of a brightness, a saturation or a displayed thickness of the information input by the touch input.

12. The electronic device of claim 11, wherein the controller changes the attribute information based on a moving touch input that starts on the displayed image object, and wherein the controller displays, on the display unit, a guide image associated with the attribute information for a user to identify the changed attribute information.

13. The electronic device of claim 12, wherein the controller selects attribute information corresponding to a point where the moving touch input is released.

14. An electronic note system comprising:
an electronic device, and
a touch tool to perform a short-range wireless communication using wireless signals,
wherein the touch tool includes:
an activation button to activate a color recognition function, and
a color recognition unit to determine a color based on the color recognition function, and
wherein the electronic device includes:
a wireless communication unit to wirelessly receive color information corresponding to the color determined by the color recognition unit; and
a controller to display an image object on a display using a color corresponding to the color information,
wherein when a first color is recognized by the touch tool, the color information includes information related to the first color and the image object is displayed in the first color, and
wherein when a second color different from the first color is recognized by the touch tool, the color information includes information related to the second color and the image object is displayed in the second color, and
the controller to activate an electronic note function in response to a touch input applied to the image object by the touch tool, and to control the display to display information with the color corresponding to the color information, and the information is input based on a touch input applied to the display.

15. The electronic note system of claim 14, wherein the touch tool further includes a touch recognition unit, and
wherein the controller sets attribute information relating to a visual appearance of information input by a touch input applied to the display, based on a user's touch input applied to the touch recognition unit.

16. The electronic note system of claim 14, wherein the controller determines a plurality of color information as pattern information when the color recognition unit determines the plurality of color information while the activation button of the touch tool is pressed, and
   wherein the image object is displayed to have a visual appearance of a pattern corresponding to the determined pattern information.

17. The electronic note system of claim 16, wherein the controller does not generate a control command corresponding to a touch input when the corresponding touch input is applied to the display by the touch tool while the activation button of the touch tool is pressed, and
   wherein the color recognition unit determines a color at a point to which the touch input is applied.

* * * * *